(12) United States Patent
Miyazaki et al.

(10) Patent No.: US 8,688,969 B2
(45) Date of Patent: Apr. 1, 2014

(54) CRYPTOGRAPHIC MANAGEMENT APPARATUS, DECRYPTION MANAGEMENT APPARATUS AND PROGRAM

(75) Inventors: Shingo Miyazaki, Fuchu (JP); Takanori Nakamizo, Chofu (JP); Akito Niwa, Mitaka (JP); Koji Okada, Tokyo (JP); Kouya Tochikubo, Yokohama (JP); Shigeyuki Fukushima, Fuchu (JP); Chiaki Ishikawa, Tokyo (JP); Noboru Koshizuka, Tokyo (JP); Ken Sakamura, Tokyo (JP)

(73) Assignees: Toshiba Solutions Corporation, Tokyo (JP); Yokosuka Telecom Research Park, Inc., Yokosuka-shi (JP)

( * ) Notice: Subject to any disclaimer, the term of this patent is extended or adjusted under 35 U.S.C. 154(b) by 886 days.

(21) Appl. No.: 12/237,718

(22) Filed: Sep. 25, 2008

(65) Prior Publication Data

US 2009/0138700 A1 May 28, 2009

(30) Foreign Application Priority Data

Sep. 28, 2007 (JP) ................................ 2007-256318
Sep. 19, 2008 (JP) ................................ 2008-241591

(51) Int. Cl.
*H04L 29/06* (2006.01)

(52) U.S. Cl.
USPC ........................................................ 713/150

(58) Field of Classification Search
USPC ........................................................ 713/150
See application file for complete search history.

(56) References Cited

U.S. PATENT DOCUMENTS

| 6,317,831 B1 * | 11/2001 | King ............................ 713/171 |
| 7,096,357 B1 * | 8/2006 | Tochikubo et al. ........... 713/164 |
| 7,580,897 B2 * | 8/2009 | Sakamura et al. ............. 705/67 |
| 7,797,247 B2 * | 9/2010 | Braun ............................ 705/60 |

FOREIGN PATENT DOCUMENTS

WO  WO2004/034633 A2 *  4/2004  ............... H04L 9/28

OTHER PUBLICATIONS

"Java™ Cryptography Architectutre (JCA) Reference Guide for Java™ Platform Standard Edition 6", Sun Microsystems, Inc., http://java.sun.com/javase/ja/6/docs/ja/technotes/guides/security/crypto/CryptoSpec.html, (English Version: http://java.sun.com/javase/6/docs/technotes/guides/security/crypto/CryptoSpec.html), 2006, 136 pages.

* cited by examiner

*Primary Examiner* — Kambiz Zand
*Assistant Examiner* — Dant Shaifer Harriman
(74) *Attorney, Agent, or Firm* — Oblon, Spivak, McClelland, Maier & Neustadt, L.L.P.

(57) ABSTRACT

A cryptographic management apparatus includes a storage unit which stores cryptographic key information containing a cryptographic key and cryptographic process condition information containing the cryptographic key information, a cryptographic process information input unit which receives an input of the object information and cryptographic key search request information, a cryptographic key information acquisition unit which acquires the cryptographic key information from the storage unit based on the search request information, a cryptographic module evaluation description information acquisition unit which acquires evaluation description information of the cryptographic module corresponding to the cryptographic key information, a cryptographic process ID creation unit which attaches an identifier of the cryptographic process condition information to the object information based on the cryptographic key information and the cryptographic module corresponding to the evaluation description information, and an output which outputs the identifier and the result of the cryptographic process executed on the object information.

14 Claims, 18 Drawing Sheets

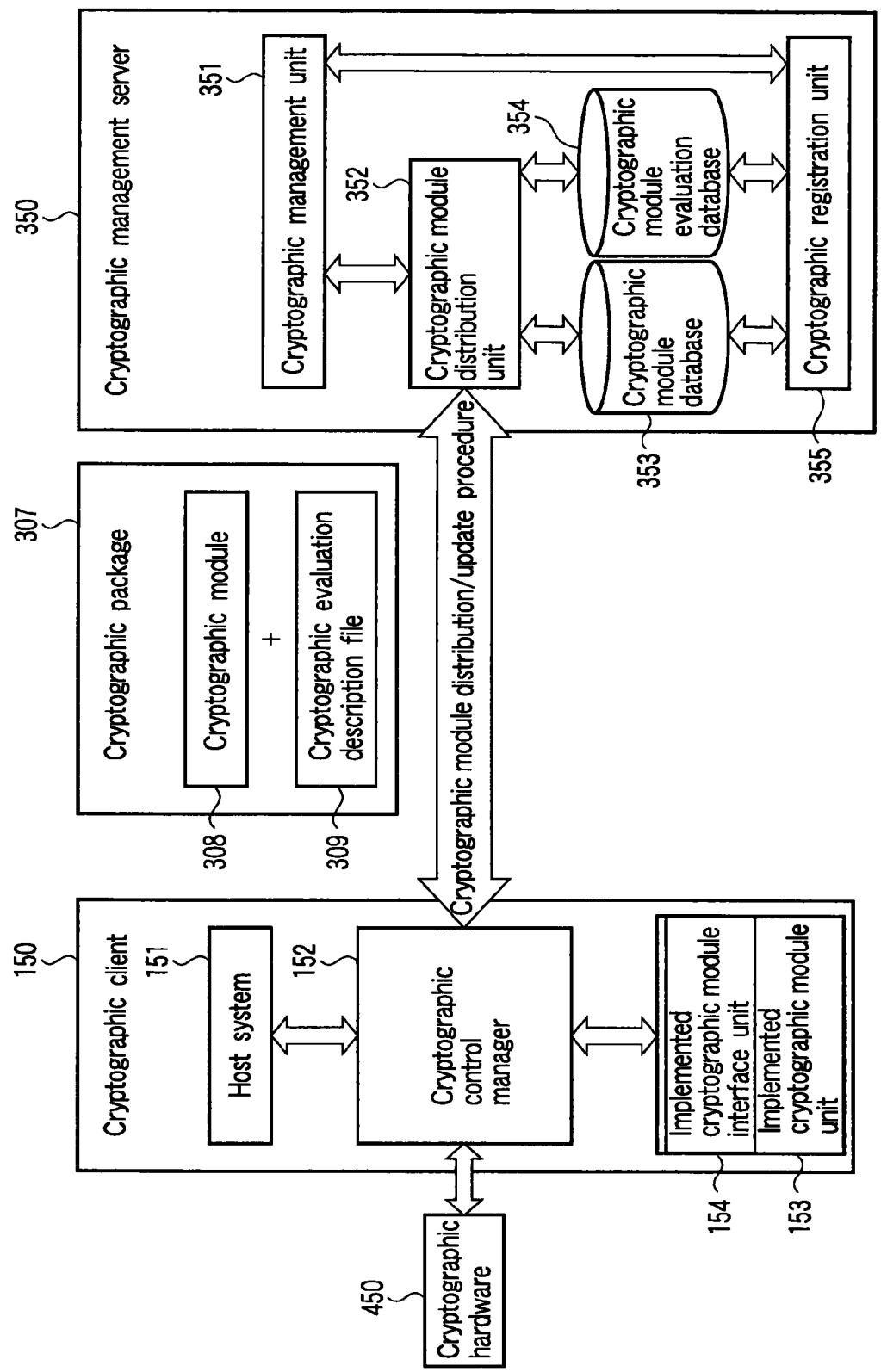
F I G. 1

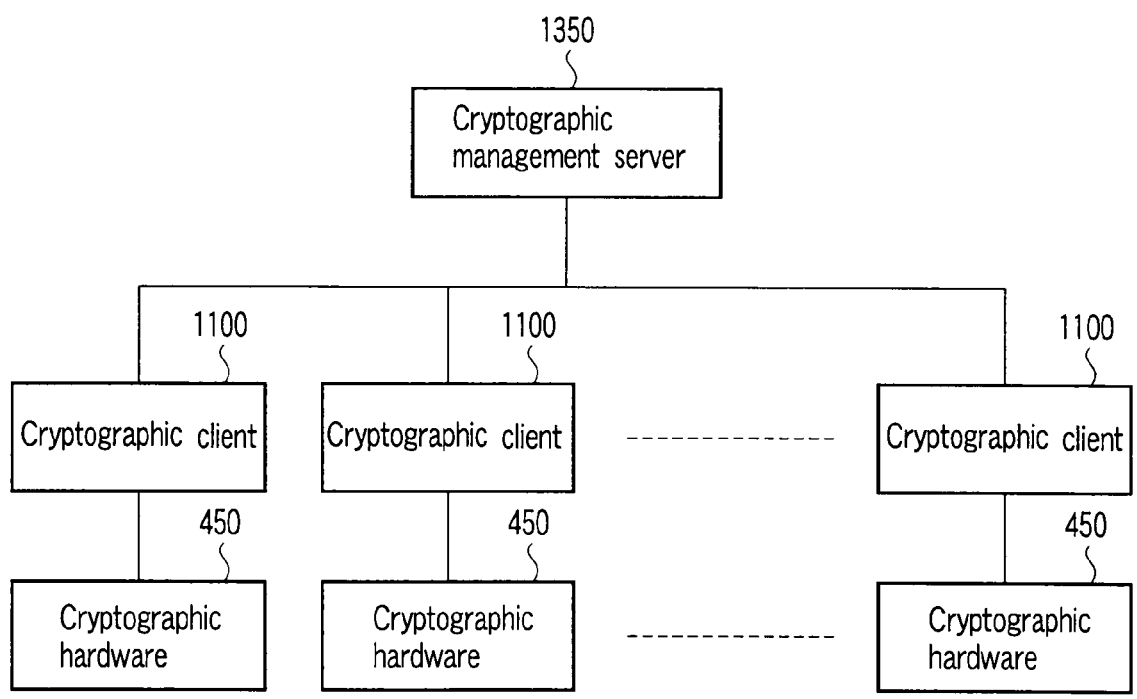
F I G. 4

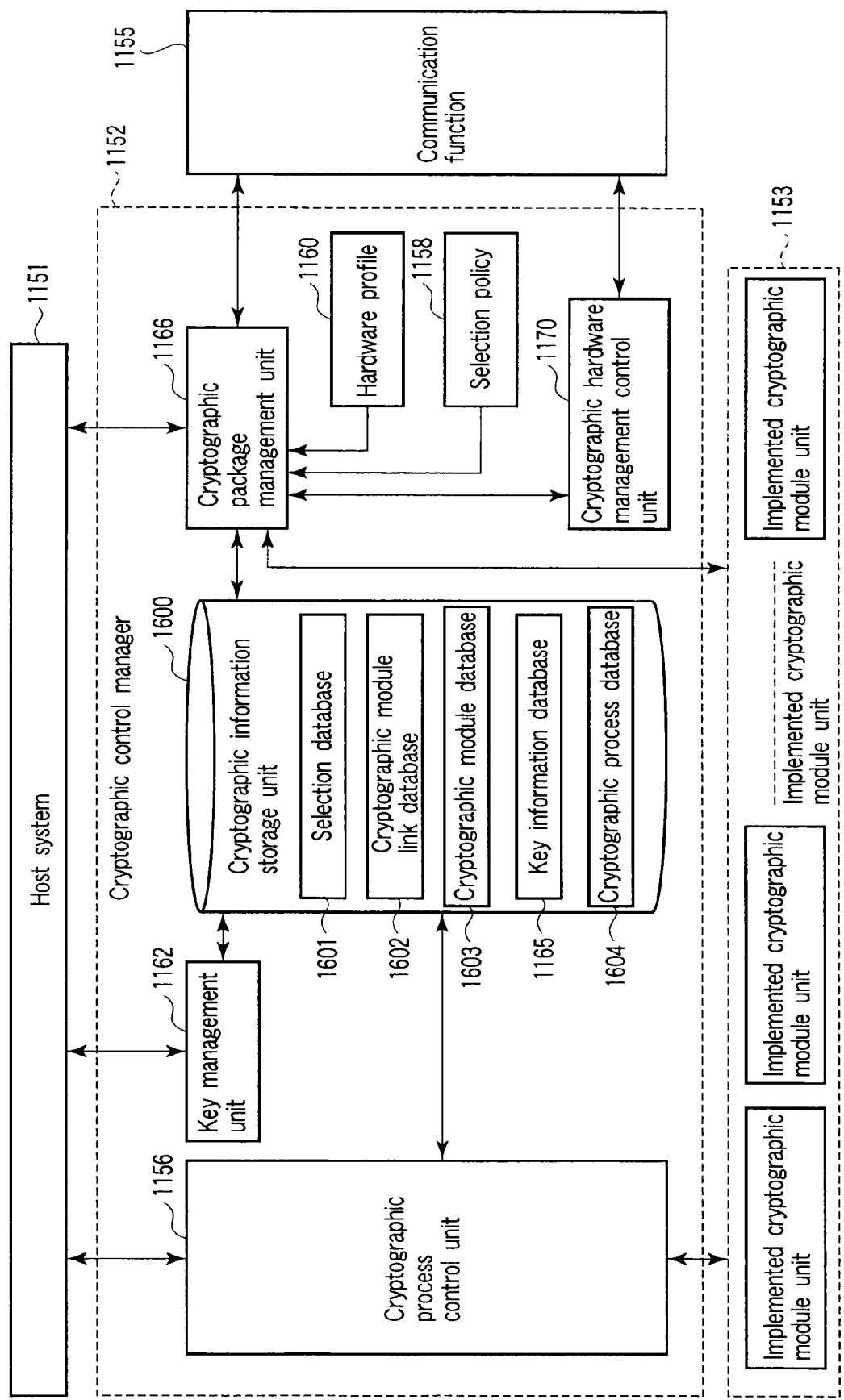
F I G. 5

| | |
|---|---|
| [KEY] policy(character string of condition information of cryptographic module including category information) | |
| Highest-order cryptographic evaluation description unit ID | Highest-order cryptographic evaluation description unit ID of cipher module corresponding to the policy |
| Algorithm ID | Algorithm ID corresponding to the policy |
| Number of linked cryptographic modules | Number of terminal cryptographic modules corresponding to the policy |
| Linked cryptographic module ID group | Terminal cryptographic module ID(plural)corresponding to the policy |
| Key length | Length of cryptographic key used for execution of cryptographic process |

F I G. 6

| | |
|---|---|
| [KEY] cryptographic evaluation description ID | |
| Cryptographic evaluation description unit ID with version | Cryptographic evaluation description ID including version number |
| Cryptographic module ID | Corresponding Implemented cryptographic module unit ID for terminal cryptographic evaluation description unit in tree structure, otherwise null |
| Category ID | Category ID of cryptographic evaluation description unit |
| Number of accesses to self-cryptographic evaluation description unit | Number of count of accessors to cryptographic evaluation description unit (accessors include two : selection database and cryptographic module link database) |
| Number of linked cryptographic evaluation description units | Number of cryptographic evaluation description units located in lower order of cryptographic evaluation description unit in tree structure |
| Linked cryptographic evaluation description unit ID | Cryptographic evaluation description unit ID located in lower order of cryptographic evaluation description unit in tree structure |

F I G. 7

| | |
|---|---|
| [KEY] cryptographic evaluation description unit ID | |
| Cryptographic evaluation description unit ID with version | Cryptographic evaluation description ID including version number |
| Linked cryptographic evaluation description unit ID | Terminal cryptographic evaluation description ID corresponding to cryptographic module |
| Category ID | Category ID of cryptographic module |
| Cryptographic module data number | Data number of cryptographic module |
| Module type | Type of cryptographic module |
| Cryptographic module file name | File name of cryptographic module |
| Number of linked selection policies | Number of policies in selected database related to cryptographic module |
| Linked selection database policy group | Policy in selected database related to cryptographic module |

F I G. 8

| | |
|---|---|
| [KEY] key ID | |
| Storage place information | Information on storage place (nil, in terminal, in cryptographic hardware) |
| Key type | Information on cryptographic type (key data, parameter unique to algorithm, parameter unique to system, certificate) |
| Key file name | Key file name |
| Key entity | Key entity data |
| Key data encrypted information | Information on key data encrypted information (not encrypted, cryptographic hardware used) |
| Key/parameter length | Length information of key and parameter |
| Category ID | Category ID corresponding to key |
| Algorithm ID | Algorithm ID corresponding to key |
| Creator | Information on key creator |
| Service life | Information on key service life |
| Operation frequency limit | Information on key operation frequency limit |

F I G. 9

| [KEY] cryptographic process ID | |
|---|---|
| Process type | Information on process type (including key addition, key creation and cryptographic process) |
| Algorithm ID | Algorithm ID of the process involved |
| Cryptographic evaluation description ID | Cryptographic evaluation description ID used as cryptographic process or key creation process |
| Category ID | Category ID of the process involved |
| Indirect access key ID | Key ID in key database accessed indirectly |
| Number of parameters | Number of parameter information groups |
| Parameter information group | Information including parameter type and size in addition to parameter proper |
| Key information group | Information including key parameter type, key ID and key size |

F I G. 10

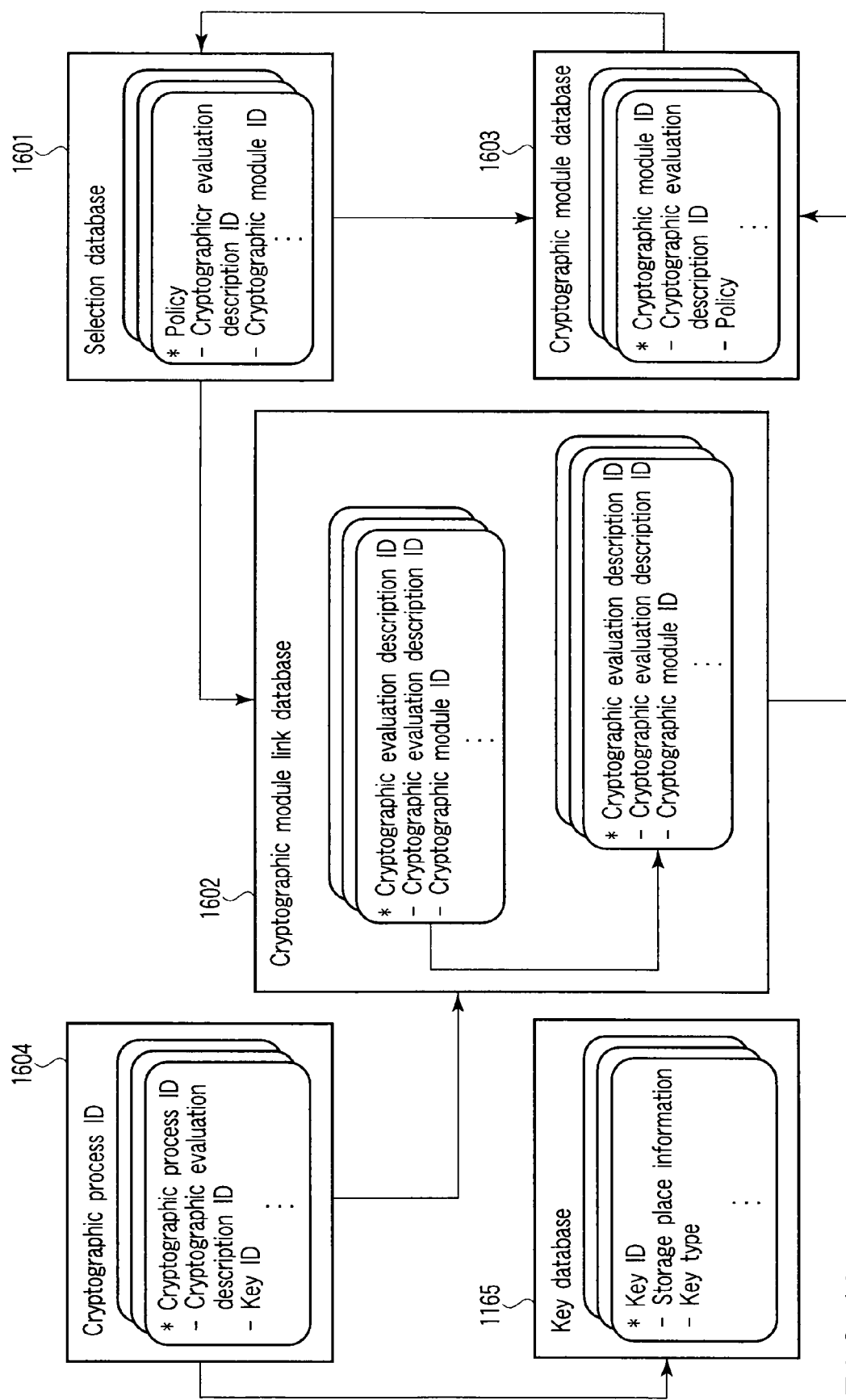
F I G. 11

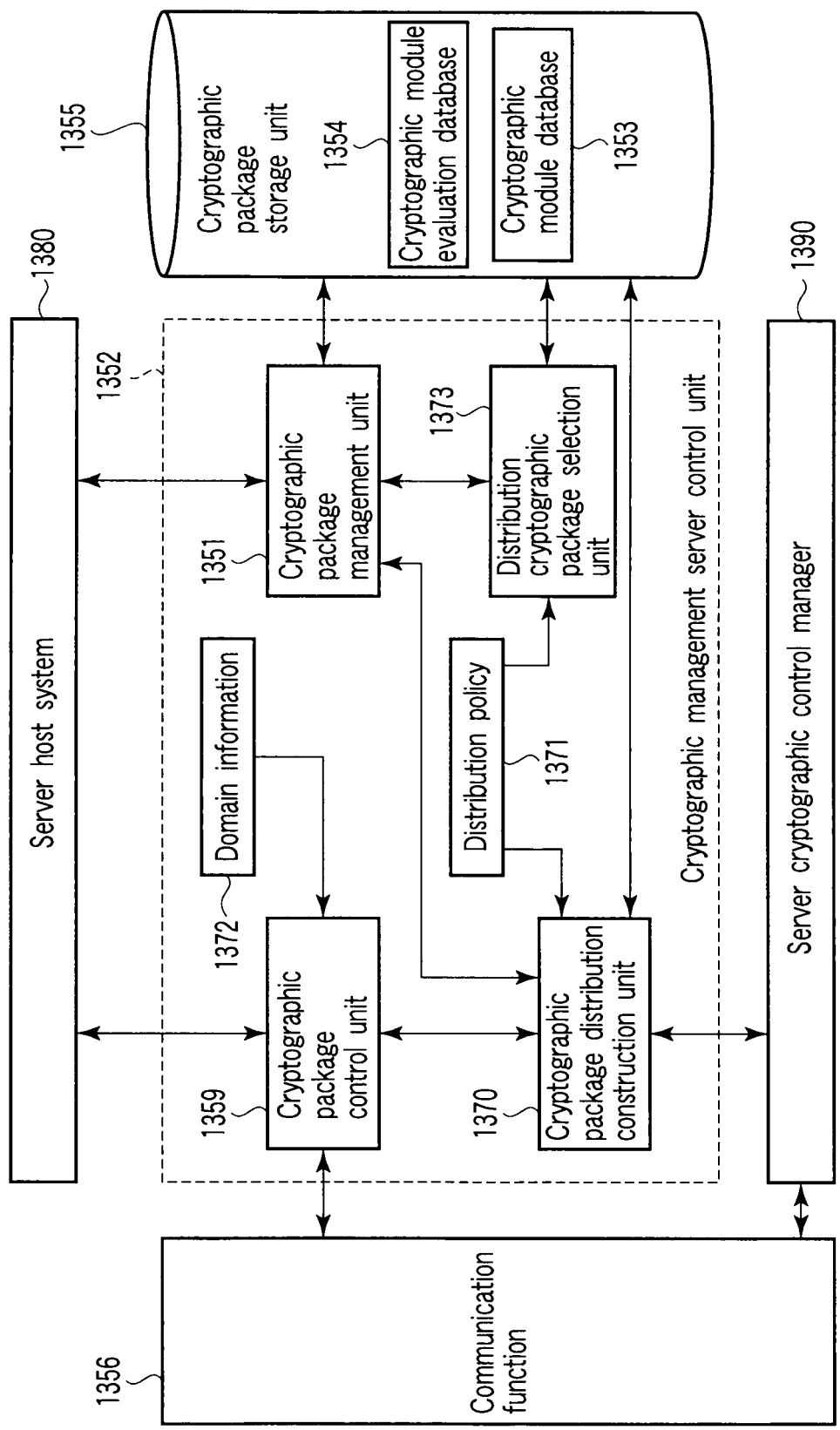
F I G. 12

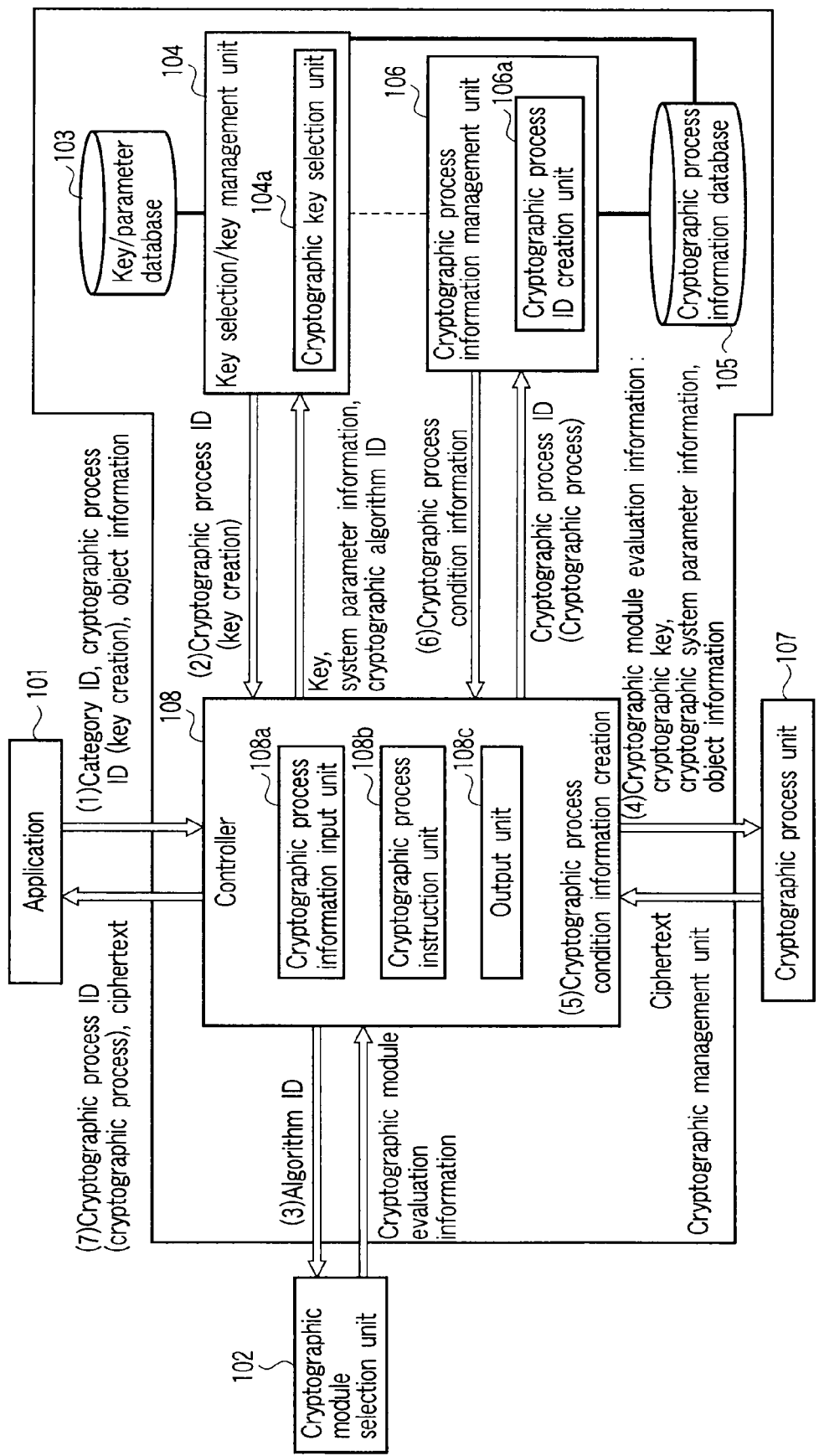
F I G. 13

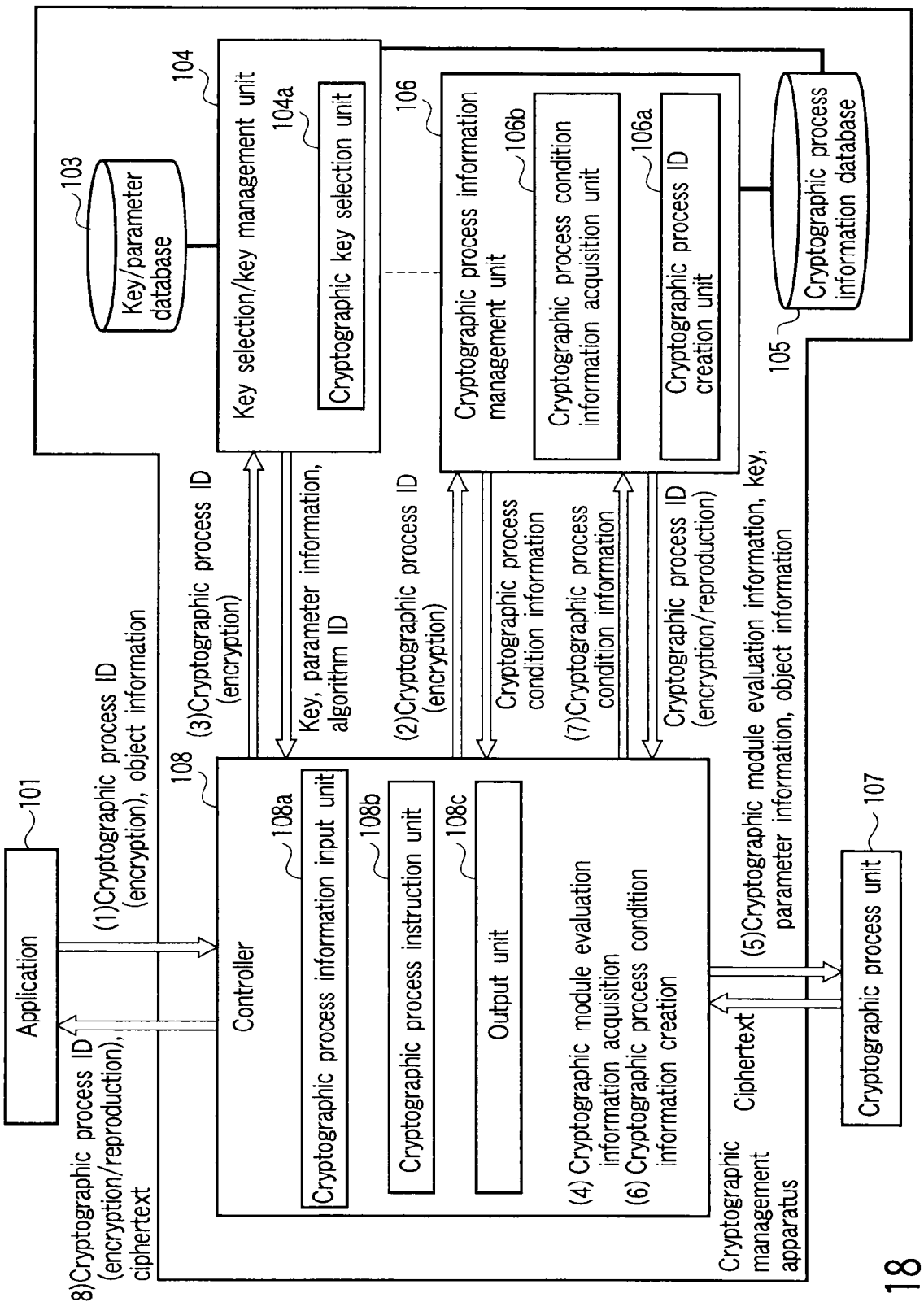
F I G. 18

CRYPTOGRAPHIC MANAGEMENT APPARATUS, DECRYPTION MANAGEMENT APPARATUS AND PROGRAM

CROSS-REFERENCE TO RELATED APPLICATIONS

This application is based upon and claims the benefit of priority from prior Japanese Patent Applications No. 2007-256318, filed Sep. 28, 2007; and No. 2008-241591, filed Sep. 19, 2008, the entire contents of both of which are incorporated herein by reference.

BACKGROUND OF THE INVENTION

1. Field of the Invention

The present invention relates to a cryptographic management apparatus, a decryption management apparatus and a program adapted to easily specify various conditions required for encryption and decryption.

2. Description of the Related Art

In the case where confidential information is handled, the encryption of the information is a conventional practice. The encryption is made possible by designating the parameters, cryptographic algorithm, key, etc used for encryption. Also, the decryption of the encrypted information requires the conditions for the particular decryption. In other words, both the encryption and decryption require the condition information indicating the parameters, the cryptographic algorithm, the key, etc. (for example, see Java Encryption Architecture Reference Guide (Java Platform Standard Edition 6)<http://java.sun.com/javase/ja/6/docs/ja/technotes/guides/security/crypto/CryptoSpec.html>).

For execution of the cryptographic process, however, much condition information is required such as the designation of the algorithm, key and parameters, and it is difficult for the user having no knowledge of encryption to grasp and select the condition information and manage the condition information properly.

In similar fashion, the execution of the decryption process requires a lot of condition information, and the user having no knowledge about decryption may find it difficult to grasp the condition information.

Also, in the case where the encryption is executed under the same conditions as the previous cryptographic process, a lot of pieces of condition information such as the designation of the algorithm, key and parameters of the same contents are required to be input in the same way as in the previous session. For the user having no knowledge about encryption, however, it is difficult to properly manage and grasp these pieces of condition information.

BRIEF SUMMARY OF THE INVENTION

An object of this invention is to provide a cryptographic management apparatus and a program adapted to centrally manage the condition information required for the cryptographic process so that the user can execute the cryptographic process easily without being conscious of the condition information.

Another object of this invention is to provide a decryption management apparatus and a program adapted to centrally manage the condition information required for the decryption process so that the user can execute the decryption process easily without being conscious of the condition information.

In a first aspect of the present invention, there is provided a cryptographic management apparatus comprising: a storage device which stores cryptographic key information including a cryptographic key used for encrypting object information and cryptographic process condition information including the cryptographic key information as the condition for executing the cryptographic process; a cryptographic process information input device configured to receive an input of the object information and cryptographic key search request information; a cryptographic key information acquisition device configured to acquire the cryptographic key information including the cryptographic key corresponding to the search request information from the storage device based on the cryptographic key search request information input; a cryptographic module evaluation description information acquisition device configured to acquire evaluation description information on a cryptographic module suitable for the cryptographic process corresponding to the cryptographic key information acquired by the cryptographic key information acquisition device; a cryptographic process ID creation device configured to attach, to the object information, an identifier of the cryptographic process condition information at the time of encrypting the object information with the cryptographic key information and the cryptographic module corresponding to the acquired evaluation description information; and an output device configured to output the attached identifier of the cryptographic process condition information and the result of execution of the cryptographic process on the object information.

In a second aspect of the present invention, there is provided a cryptographic management apparatus comprising: a storage device which stores cryptographic key information including a cryptographic key to encrypt object information and cryptographic process condition information including the cryptographic key information as the encryption condition for encrypting the object information; a cryptographic process information input device configured to receive an input of the object information and cryptographic key creation request information; a cryptographic parameter information acquisition device configured to acquire cryptographic system parameter information to create the cryptographic key corresponding to the creation request information from the storage device based on the cryptographic key creation request information input; a cryptographic key creation ID creation device configured to create cryptographic key creation condition information by relating the cryptographic system parameter information and the cryptographic key created based on the acquired cryptographic system parameter information to each other and attach an identifier of the created cryptographic key creation condition information; a first cryptographic module evaluation description information acquisition device configured to acquire evaluation description information for the cryptographic module adapted to the cryptographic process corresponding to the created cryptographic key creation condition information; a cryptographic process ID creation device configured to attach, to the object information, an identifier of the cryptographic process condition information at the time of encrypting the object information with the cryptographic key information and the cryptographic module corresponding to the acquired evaluation description information; and an output device configured to output the attached identifier of the cryptographic process condition information and the result of the cryptographic process executed on the object information.

In a third aspect of the present invention, there is provided a decryption management apparatus comprising: a storage device which stores a decryption key information including a decryption key for executing a decryption process on encrypted information and decryption process condition information including the decryption key information as the decryption condition for execution of the decryption process; a decryption process information input device configured to receive an input of the encrypted information and decryption key search request information; a decryption key information acquisition device configured to acquire the decryption key information including the decryption key corresponding to the search request information from the storage device based on the decryption key search request information input; a decryption evaluation description information acquisition device configured to acquire evaluation description information of a decryption module adapted to the decryption process corresponding to the decryption key information acquired by the decryption key information acquisition device; a decryption process ID creation device configured to attach, to the encrypted information, an identifier of the decryption process condition information for executing the decryption process on the encrypted information based on the decryption key information and the decryption module corresponding to the acquired evaluation description information; and an output device configured to output the attached identifier of the decryption process condition information and the result of the decryption process executed on the encrypted information.

In a fourth aspect of the present invention, there is provided a decryption management apparatus comprising: a storage device which stores decryption key information including a decryption key for executing a decryption process on encrypted information and decryption process condition information as the decryption condition including the decryption key information for execution of the decryption process; a decryption process information input device configured to receive an input of the encrypted information and decryption key creation request information; a decryption parameter information acquisition device configured to acquire decryption system parameter information for creating the decryption key corresponding to the creation request information from the storage device based on the decryption key creation request information input; a decryption key creation ID creation device configured to create decryption key creation condition information by relating the decryption key created based on the acquired decryption system parameter information and the decryption system parameter information to each other and attach an identifier of the created decryption key creation condition information; a first decryption evaluation description information acquisition device configured to acquire evaluation description information of a decryption module adapted to the decryption process corresponding to the created decryption key creation condition information; a decryption process ID creation device configured to attach an identifier of the decryption process condition information for execution of the decryption process on the encrypted information based on the decryption key information and the decryption module corresponding to the acquired evaluation description information; and an output device configured to output the attached identifier of the decryption process condition information and the result of the decryption process executed on the encrypted information.

In a fifth aspect of the present invention, there is provided a cryptographic management apparatus having a storage device which stores cryptographic key information for execution of a cryptographic process on object information and cryptographic process condition information for execution of the cryptographic process, comprising: a cryptographic process request receiving device configured to receive an input of the object information and a cryptographic process ID for identifying the cryptographic process condition information for the cryptographic process executed previously; a cryptographic context information acquisition device configured to acquire the cryptographic key information and cryptographic system parameter information similar to those for the previously executed cryptographic process associated with the cryptographic process ID; a cryptographic process device configured to execute the cryptographic process on the object information based on the cryptographic key information and the cryptographic system parameter information acquired by the cryptographic context information acquisition device; a cryptographic process ID creation device configured to attach an identifier for identifying the cryptographic process condition information for the cryptographic process result; and an output device configured to output the attached identifier of the cryptographic process condition information and the result of the cryptographic process executed on the object information.

BRIEF DESCRIPTION OF THE SEVERAL VIEWS OF THE DRAWING

FIG. 1 is a block diagram showing the configuration of a cryptographic module distribution system according to a first embodiment of the invention;

FIG. 4 is a block diagram showing the configuration of a cryptographic module distribution system according to a second embodiment of the invention;

FIG. 5 is a block diagram showing the configuration of a cryptographic client unit according to the same embodiment;

FIG. 6 is a diagram showing an example of the data structure of a selection database according to the same embodiment;

FIG. 7 is a diagram showing an example of the data structure of a cryptographic module link database according to the same embodiment;

FIG. 8 is a diagram showing an example of the data structure of a cryptographic module database according to the same embodiment;

FIG. 9 is a diagram showing an example of the data structure of a key information database according to the same embodiment;

FIG. 10 is a diagram showing an example of the data structure of a cryptographic process database according to the same embodiment;

FIG. 11 is a diagram showing the logic structure of the data base according to the same embodiment;

FIG. 12 is a block diagram showing the configuration of a cryptographic management server according to the same embodiment;

FIG. 13 is a diagram showing the configuration of a cryptographic process system used for a security information communication system according to a third embodiment;

FIG. 18 is a diagram showing the configuration of a cryptographic process system used for a security information communication system according to a sixth embodiment.

DETAILED DESCRIPTION OF THE INVENTION

Figure 2:
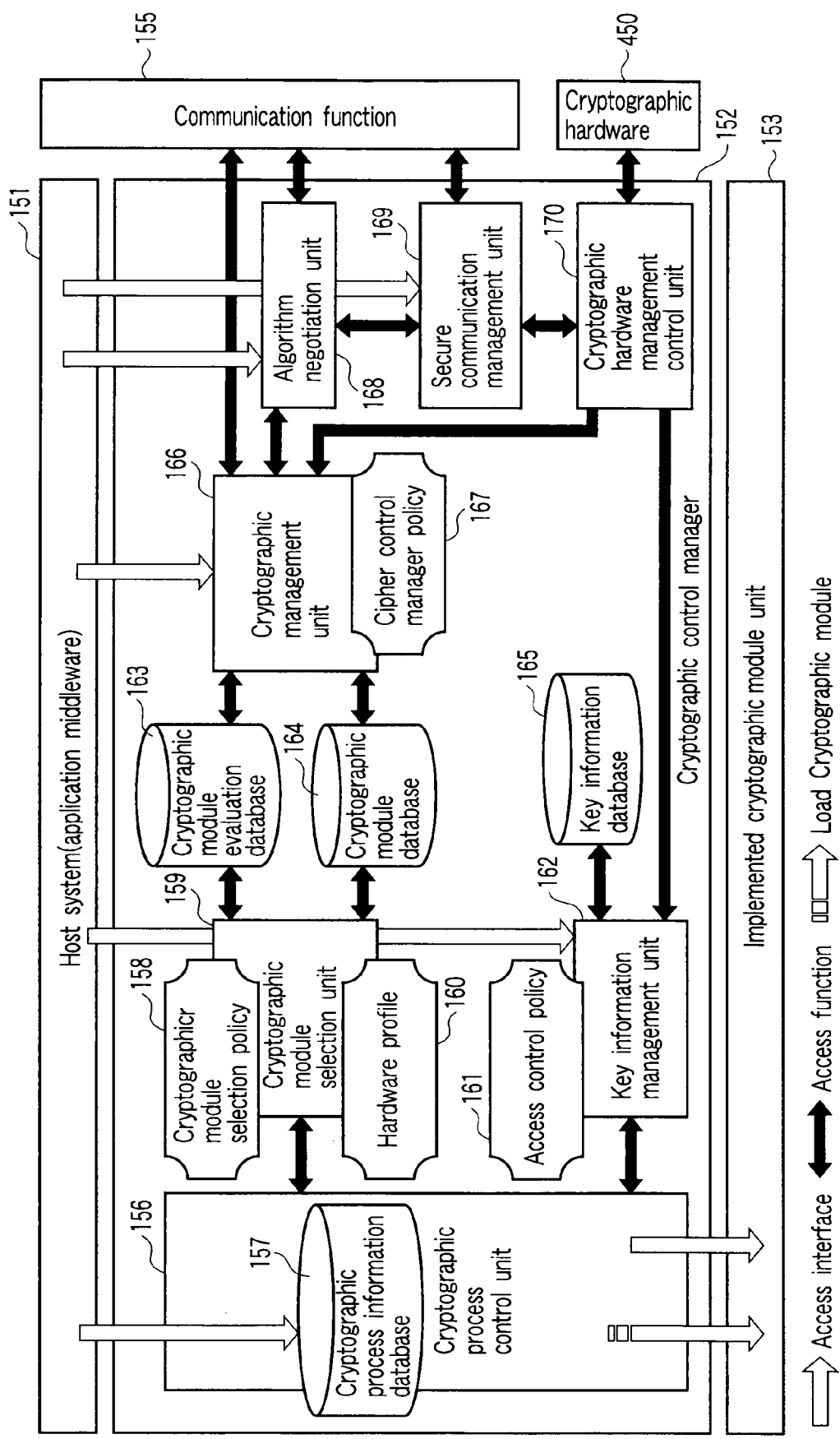
FIG. 2 is a block diagram showing the configuration of a cryptographic client unit according to the same embodiment.

The cryptographic module distribution system according to an embodiment of the invention will be explained below with reference to the drawings.

First, the outline of this system will be explained. In this system, a server and a client unit are connected to each other and the encrypted information can be transmitted and received between the server and the client unit using a cryptographic module. The cryptographic module can also be replaced periodically. As a cryptographic system with the cryptographic module replaceable, several frame works are available in which an interface not dependent on the cryptographic system is specified for each cryptographic method and in which each cryptographic vendor can be implemented. CryptAPI of Microsoft™, JCA (Java™ Cryptographic Architecture)/JCE (Java™ Cryptographic Extensions) of Sun™ and CDSA (Common Data Security Architecture) of Open Group™ are some examples.

In these frame works, an interface accessible to the cryptographic module is specified for each cryptographic method such as encryption/decryption, signature creation/verification or authenticator creation/verification, and in accordance with the interface, the cryptographic method such as DES (Data Encryption Standard) or AES (Advanced Encryption Standard) can be implemented. A specialist on the cryptography or the security, when constructing a system, selects the proper cryptographic method out of the implemented cryptographic methods, and can switch the cryptographic method by inputting to the framework a cryptographic method parameter indicating which cryptographic method is to be used.

In the case where this framework is used, assume that the security policy for operation of an application system is changed. In the prior art, the cryptography or security specialist is required to select the cryptographic method suitable for the system again, thereby encountering the problem of the human resources of the cryptography or security specialists or the cost problem. Also, in the case where a fault is found in the existing cryptographic method or a new cryptographic module is disclosed, the cryptographic method of the system in operation cannot be smoothly changed. Further, in the conventional system, it is difficult to realize an optimum security in the case where the required security strength or the processing speed varies with the environment for security operation.

This invention can solve the aforementioned problems for a cryptographic system in which the cryptographic method can be switched.

<First Embodiment>

FIG. 1 is a block diagram schematically showing the configuration of a cryptographic module distribution system according to a first embodiment of the invention.

This cryptographic system is configured of a cryptographic management server 350 for transmitting a cryptographic package 307 including a cryptographic module 308 and a cryptographic evaluation description file 309, and a cryptographic client 150 for executing the cryptographic process using the received cryptographic package 307. The evaluation of the cryptographic module described in the cryptographic evaluation description file 309 is the digitized information such as the reliability and the strength of the cryptographic method of the corresponding cryptographic module 308, which information are, for example, the security of the cryptographic method implemented, the cryptographic processing speed and the key length required for the cryptographic module.

The cryptographic management server 350 includes a cryptographic module database 353 having accumulated therein the cryptographic module 308, a cryptographic module evaluation database 354 having accumulated therein the cryptographic evaluation description file 309, a cryptographic management unit 351 for managing the cryptographic module database 353 and the cryptographic module evaluation database 354, a cryptographic module registration unit 355 for registering the new information in the cryptographic module database 353 and the cryptographic module evaluation database 354, and a cryptographic module distribution unit 352 for transmitting, by reading from the cryptographic module database 353 and the cryptographic module evaluation database 354, the optimum cryptographic package 307 in accordance with the request from the cryptographic client 150.

The cryptographic client 150 is configured of a host system 151 providing an application or middle ware for accessing and using the cryptographic function provided by the implemented cryptographic module unit 153 through a cryptographic control manager 152, the cryptographic control manager 152 for switching the cryptographic function provided from the implemented cryptographic module unit 153 of the cryptographic package 307 transmitted from the cryptographic management server 350, a tamper resistant cryptographic hardware unit 450 with the cryptographic process of the main cryptographic method realized as hardware and an implemented cryptographic module unit 153 providing the cryptographic function with the cryptographic module 308 having implemented thereon a cryptographic method in an executable/usable state. The cryptographic management server 350, based on the request from the cryptographic client 150, transmits the proper cryptographic package 307 to the cryptographic client 150.

FIG. 2 is a diagram showing a detailed configuration of the cryptographic client 150. The cryptographic control manager 152 is configured of a cryptographic process control unit 156 having a cryptographic process information database 157, a cryptographic module database 164, a cryptographic module evaluation database 163, a cryptographic module selection unit 159 having a cryptographic module selection policy 158 and a hardware profile 160, a key information database 165, a key information management unit 162 having an access control policy 161 describing the control policy for access to the key information database 165, a cryptographic management unit 166 having a cryptographic control manager policy 167, a cryptographic hardware management control unit 170 for conducting communication with the cryptographic hardware unit 450, a communication function 155 for conducting communication with external devices, an algorithm negotiation unit 168 collaborating with the communication function 155 and a secure communication management unit 169 collaborating with the communication function 155.

The cryptographic process control unit 156 executes the key creation process, the key registration process and the cryptographic process based on the access for the cryptographic process from the host system 151.

In the key creation process, the cryptographic process control unit 156 selects, through the cryptographic module selection unit 159, the cryptographic module 308 for the cryptographic method designated by the cryptographic process identifier at the time when the cryptographic method, the key length and the cryptographic method parameter designated by the host system 151 are registered in the cryptographic process information database 157.

The cryptographic process control unit 156 loads the selected cryptographic module 308 on a memory and thereby sets the implemented cryptographic module unit 153 in execution mode. The cryptographic method parameter for key creation corresponding to the designated cryptographic process identifier is extracted by the cryptographic process control unit 156 from the key information database 165 through the key information management unit 162. Once the cryptographic process control unit 156 accesses the implemented cryptographic module unit 153 with the designated key length and the extracted cryptographic method parameter, the implemented cryptographic module unit 153 creates the key information. The cryptographic process control unit 156 receives the created key information. The cryptographic process control unit 156 operates in such a manner that the key information created by the implemented cryptographic module unit 153 is registered in the key information database 165 through the key information management unit 162. Then, the cryptographic process control unit 156 receives the key identifier corresponding to the particular key information, stores the relation between the cryptographic process identifier newly issued as the processing result and the key identifier in the cryptographic process information database 157 and returns the cryptographic process identifier to the host system 151.

In the key registration, the cryptographic process control unit 156 operates in such a manner that the key information designated by the host system 151 is registered in the key information database 165 through the key information management unit 162. The cryptographic process information unit 156 then receives the key identifier and stores, in the cryptographic process information database 157, the relation between the key identifier and the cryptographic process identifier newly issued as the processing result, and returns the key identifier of the cryptographic process to the host system 151.

In the cryptographic process, the cryptographic process control unit 156 receives, from the host system 151, the data (plaintext) to be encrypted and the condition information on the cryptographic module the designated by the host system 151, and the cryptographic process identifier received at the time of key creation or key registration. Then, the cryptographic process control unit 156 selects the proper cryptographic module 308 from the cryptographic module selection unit 159 by referring to the condition information on the cryptographic module, loads the selected cryptographic module 308 on a memory for execution as the implemented cryptographic module unit 153, extracts the key information corresponding to the designated cryptographic process identifier from the key information database 165 through the key information management unit 162, inputs the designated data to be encrypted and the extracted key information to the implemented cryptographic module unit 153 accessed, receives the corresponding encrypted data processed, stores, in the cryptographic process information database 157, the relation between the key identifier and the cryptographic process identifier newly issued as the processing result, and returns the cryptographic process identifier. By coupling the key information, etc. used for the cryptographic process to the cryptographic process identifier, the cryptographic process can be executed again and the decryption can be carried out easily.

The cryptographic module database 164 is a storage unit for storing the cryptographic module 308 received from the cryptographic management server 350.

The cryptographic module evaluation database 354 is a storage unit for storing the cryptographic evaluation description file 309 received from the cryptographic management server 350.

In the cryptographic module selection unit 159, the most proper cryptographic module 308 is selected from those stored in the cryptographic module database 164 based on the condition information on the cryptographic module, input from the host system 151, with regard to the cryptographic method category such as encryption or signature creation, the name of the maker of the cryptographic module 308, the information on the hardware operated by the cryptographic module 308 and the cryptographic module evaluation information. The cryptographic module 308 is selected from those adapted to the hardware profile 160 describing the hardware information on the cryptographic client 150 in such a manner as to conform with the cryptographic module selection policy 158 describing the policy of the user of the cryptographic client 150.

The hardware profile 160 is the information including the CPU architecture, the CPU clock and the mounted memory capacity of the cryptographic client 150. The cryptographic module selection policy 158 is the information, in the presence of plural cryptographic modules selected by the input conditions, including the condition most preferred by the user, the maker of the cryptographic module used most preferred by the user and the cryptographic method desirably prohibited by the user.

As described above, the cryptographic module selection unit 159 selects the cryptographic module 308 coincident with the input information by reference to the input information from the host system 151, the hardware profile 160 and the cryptographic module selection policy 158. In the case where the cryptographic module selection unit 159 selects the cryptographic module 308 uniquely, the selected cryptographic module 308 is retrieved from the cryptographic module database 164. In the case where the cryptographic module 308 cannot be uniquely selected, on the other hand, the cryptographic module selection unit 159 outputs an error.

The information such as the key information or encryption method parameter designated at the time of accessing the implemented cryptographic module unit 153 are caused by the key information management unit 162 to be stored in or read from the key information database 165. In the case where more than one piece of the information such as the key information or the cryptographic method parameter is designated, the key information management unit 162 relates the plural pieces of the information to each other so as to permit collective retrieval thereof and registers them in the key information database 165. Also, the key information management unit 162, when retrieving the cryptographic method parameter or the key information from the key information database 165, controls the access to the key information from the plural host systems 151 in accordance with the cryptographic module selection policy 158.

The key information management unit 162 verifies the legitimacy of the credential (the key or the password for access) designated by the host system 151, based on the particular credential, the key identifier desirably accessed and the cryptographic process identifier related to the key identifier. The key information management unit 162 judges the access advisability based on the access control policy 161 describing the specification of the key information of the key information database 165 accessible to the credential holder.

In the case where the access is judged as advisable, the key information management unit 162 extracts the key identifier corresponding to the cryptographic process identifier from the key information database 165, extracts and returns the cryptographic method parameter and the key information corresponding to the key identifier to the host system 151. In the case where the access is judged as inadvisable, on the other hand, an error is returned to the host system 151.

The cryptographic management unit 166 conducts communication with the cryptographic management server 350 through the communication function 155 and receives the cryptographic package 307 in accordance with the procedure for initial registration, distribution and the updating of the cryptographic module. At the time when the cryptographic management unit 166 receives the cryptographic package 307 from the cryptographic management server 350, the process is executed in accordance with the contents of the cryptographic control manager policy 167. The cryptographic control manager policy 167 have five contents, for example, described below. The first one is whether the server authentication can be executed in the communication with the cryptographic management server 350. The second one is whether the encryption is possible or not at the time of receiving the cryptographic package 307 from the cryptographic management server 350. The third one is whether an alteration detector MAC (message authentication code) can be added or not at the time of receiving the cryptographic package 307, etc. from the cryptographic management server 350. The fourth one is whether the authenticator of the received cryptographic package 307 can be verified or not. The fifth one is the setting information for the periodical updating, i.e. the information periodically indicating the frequency and the possibility of updating the cryptographic package 307 stored in the cryptographic module evaluation database 163 and the cryptographic module database 164.

The cryptographic hardware management control unit 170 conducts communication with the cryptographic hardware 450, and receives the cryptographic package 307 from the cryptographic management server 350 in accordance with the procedure for initial cryptographic module registration. The cryptographic package 307, if encrypted when received, is decrypted by the cryptographic hardware 450. Also, upon detection that the alteration detector is added to the cryptographic module 308, the cryptographic hardware 450 detects the alteration of the cryptographic module 308.

The algorithm negotiation unit 168, in collaboration with the communication function 155, arbiters between the cryptographic method used for construction of a communication session and the cryptographic method used for the communication session before constructing a secure communication session between two cryptographic clients.

The secure communication management unit 169, in collaboration with the communication function 155, constructs a secure communication session with another cryptographic client 150. The secure communication management unit 169, when constructing a secure communication, determines the cryptographic method to be used in the communication session construction and the cryptographic method used in the communication session, after which the session key is shared.

Figure 3:
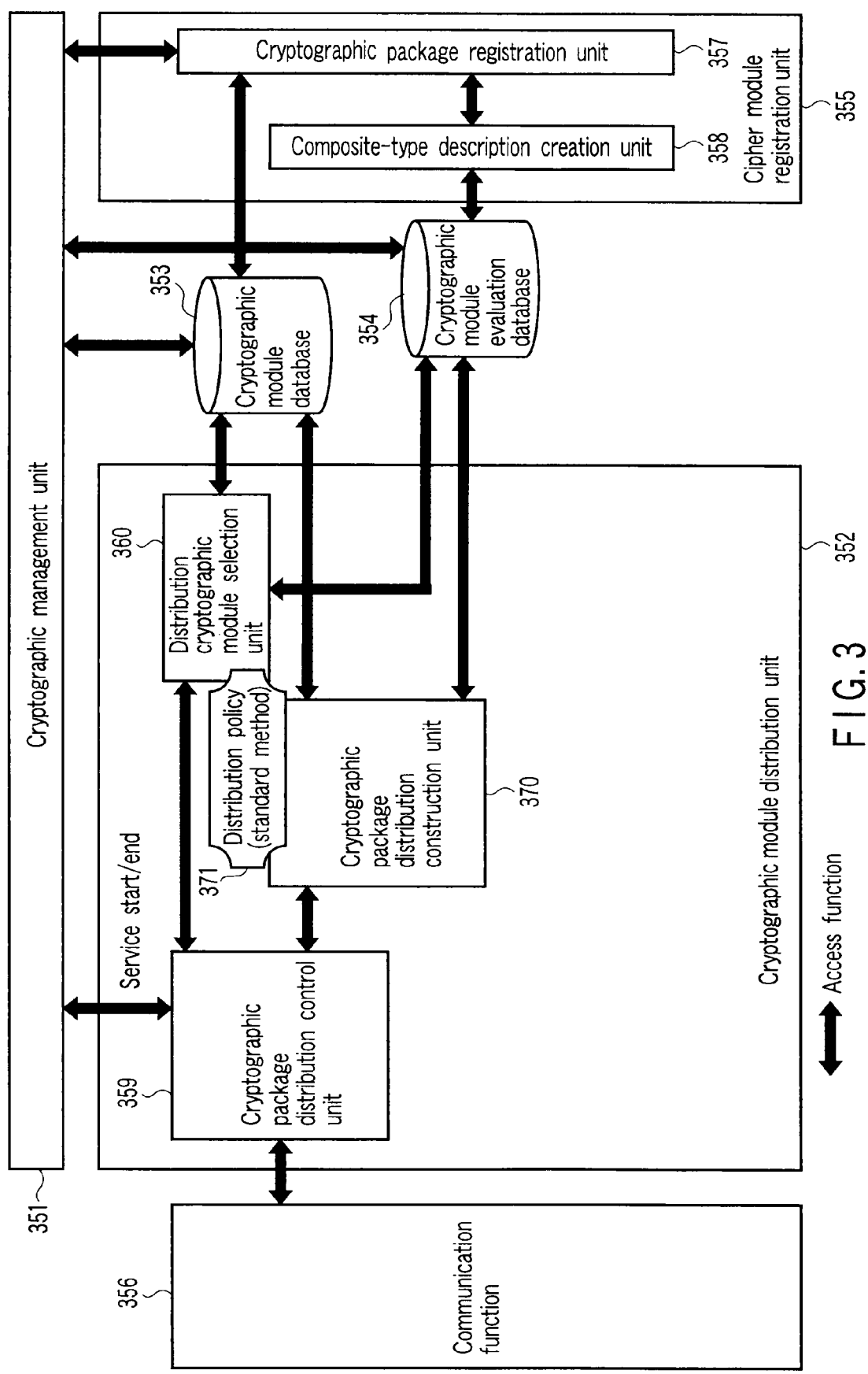
FIG. 3 is a block diagram showing the configuration of a cryptographic management server according to the same embodiment.

FIG. 3 is a diagram showing a detailed configuration of the cryptographic management server 350. The cryptographic management server 350 is configured of a cryptographic module database 353, a cryptographic module evaluation database 354, a cryptographic management unit 351 for executing such process as reading or updating of the information stored in the cryptographic module database 353 and the cryptographic module evaluation database 354, a cryptographic module registration unit 355 for registering the information in the cryptographic module database 353 and the cryptographic module evaluation database 354, and a cryptographic module distribution unit 352 for transmitting the cryptographic module to the cryptographic client 150.

The cryptographic module database 353 is a data base for storing the cryptographic module 308 stored in advance or input by the user.

The cryptographic module evaluation database 354 is a data base for storing the cryptographic evaluation description file 309 stored in advance or input by the user.

The cryptographic management unit 351 has an interface which, for the user of the cryptographic management server 350, searches the cryptographic module 308 and the cryptographic package 307 stored in the cryptographic module database 353 and the cryptographic module evaluation database 354, displays the contents of the cryptographic module evaluation unit and the cryptographic module list managed by the cryptographic management unit 351, updates the existing cryptographic module, deletes the existing cryptographic module, registers a new cryptographic module and activates/deactivates the cryptographic module distribution unit. The cryptographic management unit 351 requests the cryptographic module registration unit 355 to register a new cryptographic module, if any.

The cryptographic module registration unit 355 includes a cryptographic package registration unit 357 and a composite description creation unit 358.

The cryptographic module distribution unit 352 includes a cryptographic package distribution control unit 359, a cryptographic package distribution construction unit 370 having a distribution policy 371, and a distribution cryptographic module selection unit 360 having the distribution policy 371. The cryptographic module distribution unit 352 interprets the request from the cryptographic client 150 and executes the waiting service.

The distribution cryptographic module selection unit 360 selects the cryptographic module 308 suitable for distribution.

In the cryptographic package distribution construction unit 370, based on the cryptographic module 308 selected by the distribution cryptographic module selection unit 360, the cryptographic module 308 and the cryptographic evaluation description file 309 corresponding to the cryptographic module 308 are constructed in a distributable form as a cryptographic package 307 in accordance with the distribution policy 371.

In the construction process executed by the cryptographic package distribution construction unit 370, the contents stored in the cryptographic module evaluation database 354 are created in a specified form as the cryptographic evaluation description file 309, and an authenticator is added to the cryptographic package 307 for the purpose of distribution and authentication by the cryptographic management server 350. The cryptographic module 308 and the cryptographic evaluation description file 309 are paired into a cryptographic package 307.

<Second Embodiment>

The first embodiment deals with a case in which the selection of the optimum cryptographic method is processed by the cryptographic client. According to the second embodiment, on the other hand, the cryptographic management server plays the leading role in selecting the optimum cryptographic method. Specifically, in the cryptographic module distribution system shown in FIG. 4, the result information of the cryptographic method selected by the cryptographic management server 1350 is managed and utilized by the module selection policy storage unit 110 as a mechanism collaborating with the server. Especially, in the case where the computation capacity of the module selection policy storage unit 110 is low, the arithmetic operation is supported by the cryptographic management server 1350, so that the response performance in the cryptographic client 1100 can be improved.

Specifically, the cryptographic management server 1350 selects the optimum cryptographic module 308 in response to the request from the host system 151, and the cryptographic control manager 1152 of the cryptographic client 1100 receives the result thereof so that the relation between the request conditions and the optimum cryptographic module 308 is managed by the cryptographic information storage unit 1600 in the client 1100. The cryptographic control manager 1152, based on the relation between the request from the host system 151 and the cryptographic module 308 optimally suitable for the request, executes the process responsive to the cryptographic process control request from the host system 151. Unlike in the first embodiment, therefore, the cryptographic client 1100 is not always required to manage the cryptographic package 307 required for the total select function of the cryptographic module 308 or the selection of the cryptographic module 308 or to receive the cryptographic package 307 from the cryptographic management server 1350.

FIG. 4 is block diagram showing a general configuration of the cryptographic module distribution system according to the second embodiment of the invention. This system is configured of at least one cryptographic client 1100, at least one cryptographic hardware unit 1450 and a cryptographic management server 1350. The cryptographic hardware unit 1450 is similar to the corresponding one of the first embodiment. Plural cryptographic hardware units 1450 may be connected to each cryptographic client 1100. Also, the cryptographic hardware unit 1450 may be implemented in the cryptographic client 1100.

FIG. 5 is a block diagram showing the configuration of the cryptographic client 1100. The cryptographic client 1100 includes a host system 1151, a cryptographic control manager 1152, an implemented cryptographic module unit 1153 and a communication function 1155. The selection policy 1158 is a file for setting the priority information on the security, the processing speed and the resources. The host system 1151 and the implemented cryptographic module unit 1153 have a similar configuration and function to those of the first embodiment.

The cryptographic control manager unit 1152 includes a cryptographic process control unit 1156, a key management unit 1162, a cryptographic information storage unit 1600, a cryptographic package management unit 1166 and a cryptographic hardware management control unit 1170.

The cryptographic process control unit 1156 has the function of receiving the cryptographic process control request including the cryptographic process conditions from the host system 1151, the function of specifying the cryptographic module 1153 based on the cryptographic process conditions by reference to the cryptographic information storage unit 1600, the function of requesting the cryptographic process to the implemented cryptographic module unit 1153 in accordance with the cryptographic process execution timing, the function of issuing the cryptographic process ID for the cryptographic process and storing the cryptographic process ID as related to the information on the cryptographic process in the cryptographic information storage unit 1600, and the function of outputting the cryptographic process result and the cryptographic process ID for the cryptographic process obtained from the implemented cryptographic module unit 1153 to the host system 1151.

The key management unit 1162 has the function of registering, deleting, acquiring, searching or updating the key information in the key information database 1165 of the cryptographic information storage unit 1600 in accordance with the request from the host system 1151, the function of issuing the key ID and storing the key ID as related to the information on the registration process in the cryptographic information storage unit 1600 in the case where the cryptographic key is normally registered, and the function of outputting each process result, together with the cryptographic process ID or the key ID if required, to the host system 1151.

The cryptographic information storage unit 1600 has the function of storing the selection database 1601, the cryptographic module link database 1602, the cryptographic module database 1603, the key information database 1165 and the cryptographic process database 1604. Also, the cryptographic information storage unit 1600 may have the function of controlling and managing each database of the cryptographic information storage unit 1600 in accordance with the request from the key management unit 1162, the cryptographic process control unit 1156 and the cryptographic package management unit 1166.

The data structure of the selection database 1601 is as shown in FIG. 6. The data structure of the cryptographic module link database 1602 is as shown in FIG. 7. The data structure of the cryptographic module database 1603 is as shown in FIG. 8. The data structure of the key information database 1165 is as shown in FIG. 9. The data structure of the cryptographic process database 1604 is as shown in FIG. 10. FIG. 11 shows the logic relation between the data bases included in the cryptographic information storage unit 1600.

The cryptographic package management unit 1166 has the functions described below.

First, the cryptographic package management unit 1166 has the function of registering, in the cryptographic information storage unit 1600, the algorithm ID, the cryptographic module evaluation description ID, the cryptographic module ID and the recommended key length information of the selected cryptographic package 307 obtained by transmitting, through the communication function 1155 to the cryptographic management server 1350, the information including the selection conditions, the selection policy and the hardware profile input from the host system 1151.

Also, the cryptographic package management unit 1166 has the function of specifying the algorithm ID of the corresponding key creation module from the encryption algorithm by specifying the selection database based on the selection conditions input from the host system 1151.

Also, the cryptographic package management unit 1166 has the function of registering, in the cryptographic information storage unit 1600, the algorithm ID, the cryptographic module evaluation ID and the cryptographic module ID of the key creation module selected by the cryptographic management server 1350.

Also, the cryptographic package management unit 1166 has the function of executing the updating process of the relation between the cryptographic package 307 and the selection policy of the cryptographic package 307 and the entity of the cryptographic package 307 held in the cryptographic control manager 1152 in collaboration with the cryptographic management server 1350 through the communication function 1155 based on the last update notification identifier held in the cryptographic control manager 1152 and the contents requested from the host system 1151.

Also, the cryptographic package management unit 1166 has the function of canceling the relation between the data bases included in the cryptographic information storage unit 1600 related to the cryptographic package 307 by deleting, from the cryptographic information storage unit 1600, the entity of the cryptographic package 307 requested from the host system 1151.

The cryptographic hardware management control unit 1170 has the function of controlling the communication to the cryptographic hardware through the communication function 1155 in accordance with the request from each part of the cryptographic control manager unit 1152.

The communication function 1155 has the function of mutual communication between the cryptographic package management unit 1166 or the cryptographic hardware management control unit 1170 and the mating communication unit or the cryptographic hardware.

FIG. 12 is a function block diagram showing the configuration of the cryptographic management server 1350. The cryptographic management server 1350 includes a server host system 1380, a communication function 1356, a cryptographic management server control unit 1352, a cryptographic package storage unit 1355 and a server cryptographic control manager 1390.

The server host system 1380 has the function, in addition to those of the server host system 1380 of the cryptographic client device 1100, of transmitting the control request from the system manager on the cryptographic management to the cryptographic management server control unit 1352.

The communication function 1356 has the function of mutual communication between the cryptographic management server control unit 1352 or the server cryptographic control manager 1390 and the mating communication unit, the cryptographic hardware or the simulator of the cryptographic hardware operation.

The cryptographic management server control unit 1352 includes the cryptographic package control unit 1359, the cryptographic package management unit 1351, the cryptographic package distribution construction unit 1370 and the distribution cryptographic package selection unit 1373.

The cryptographic package control unit 1359 has the function of registering the cryptographic package 307 at the request of the server host system 1380, the function of updating the registered cryptographic package at the request of the server host system 1380, the function of verifying the vendor authenticator for confirming the source of the corresponding cryptographic package at the time when the cryptographic package is supplied from the vendor, the function of creating the composite cryptographic module evaluation description section in combination with plural unit cryptographic module evaluation description sections or plural composite cryptographic module evaluation description sections, the function of searching and acquiring the list of the cryptographic package 307 registered in the cryptographic module 1355, the function of deleting the cryptographic module 308 and the related cryptographic package 307 from the cryptographic module database 1355 at the request of the server host system 1380, and the function of outputting the log for the registration, update or the deletion process executed on the cryptographic package storage unit 1355.

The cryptographic package management unit 1351 has the function of processing the control requests from the plural cryptographic clients 1100 in parallel, the function of executing the initial registration process, the distribution process, the update process, the selection process, the update notification process and the cryptographic management domain transfer process of the cryptographic package 307, the function of establishing the communication path protected by security between the cryptographic clients 1100 and the cryptographic management server 1350, the function of managing the situation of the cryptographic client management unit existing in the domain managed by the cryptographic management server 1350, and the function of creating the log for the initial registration process, the distribution process, the update process, the selection process, the update notification process and the cryptographic management domain transfer process of the cryptographic package 307.

The cryptographic package distribution construction unit 1370 has the function of acquiring, from the cryptographic module database 1355, the cryptographic package 307 selected by the distribution cryptographic package selection unit 1373, the function of outputting the data of each description item stored in the cryptographic package storage unit 1355, in the form constructed of the cryptographic module evaluation description such as XML, the function of creating the key by requesting the server cryptographic control manager 1390 to execute the process in accordance with the security method designated for the key used in the security communication of the cryptographic package control unit 1359, the function of managing the information on the key based on the information including the security method of the key and ID of the cryptographic client 1100, and the function of executing the security process of the data authentication and the data confidentiality for the information transmitted to the cryptographic client 1100 from the cryptographic management server 1350 in accordance with the security method and the security level defined in the distribution policy of the cryptographic management server 1350.

The distribution cryptographic package selection unit 1373 has the function of judging the initial registration of the cryptographic package, selecting the cryptographic method and selecting the cryptographic package, the function of judging the distribution and selecting the cryptographic package in the cryptographic package distribution process, the function of judging the distribution in the cryptographic package update process, the function of acquiring the update cryptographic module list and selecting the cryptographic package in the cryptographic package update process, the function of judging the selection and selecting the cryptographic package in the cryptographic package selection process, the function of judging the movement and creating the domain movement process information in the cryptographic management domain transfer and the function of searching the cryptographic package storage unit for the cryptographic package satisfying the selection conditions, the selection policy and the hardware policy.

The cryptographic module database 1355 includes a cryptographic module database 1353 for recording and managing the registered cryptographic module 308 and the cryptographic module evaluation database 1354 for recording and managing the cryptographic evaluation description filed 309.

The server cryptographic control manager 1390, in addition to the similar function to the cryptographic control manager unit 1152 of the cryptographic client 1100, has the function of performing encrypted and authenticated communication with the cryptographic resource management control and other communication units in the cryptographic management server 1350 in collaboration with the cryptographic management server control unit 1352.

<Third Embodiment>

Next, there will be explained a cryptographic module distribution system, based on the cryptographic module distribution system described above, in which the encryption and decryption processes are simplified using the ID thereof. An explanation is made here about the aforementioned cryptographic module distribution system for executing a predetermined cryptographic process for the information to be encrypted and outputting the identifier information of the cryptographic process conditions and the information after the cryptographic process. In the embodiments described below, the cryptographic process is assumed to include the process of encrypting the information to be encrypted and the process of decrypting the encrypted information.

Now, the process executed by the cryptographic management apparatus to encrypt the information will be explained with reference to FIG. 13.

FIG. 13 is a diagram showing the configuration of the cryptographic process system used in the cryptographic module distribution system according to the third embodiment.

In FIG. 13, an application 101 outputs the information to be encrypted (hereinafter sometimes referred to as the object information) (or the encrypted ciphertext) to the controller 108 and acquires the information (or the original plaintext decrypted from the ciphertext) after encryption of the object information from the controller 108.

The information output from the application 101 to the controller 108 include the category ID, the cryptographic process ID (key creation) created at the time of cryptographic key creation and providing an identifier of the cryptographic key creation process and the object information (plaintext). The category ID is the information indicating the classification of the cryptographic method. The category includes the common key cryptosystem, the mask creation function and the hash function, and is further classified into subcategories. The subcategories for the common key cryptosystem, for example, are classified into a block cipher and a stream cipher. The block cipher is further classified into plural items including the cipher core, the encryption mode and the padding (extension module). In these subcategories, the various cryptographic algorithms (DES, AES, etc.) are classified and specified.

The cryptographic process ID (key creation) is the information transmitted from the application 101 to the controller 108. This cryptographic process ID (key creation) is the information with which the application 101 requests the cryptographic management unit to acquire the cryptographic key for executing the cryptographic process on the information to be encrypted, and which is generated by the application 101 or the host thereof or the cryptographic management unit according to the fifth embodiment described later for each cryptographic key.

The cryptographic module selection unit 102 is to select the cryptographic module for executing the cryptographic process, based on the cryptographic algorithm ID output from the key selection/key management unit 104 in accordance with the cryptographic process ID (key creation) received from the application 101 through the controller 108. Also, the cryptographic module selection unit 102, supplied with the cryptographic algorithm ID, selects the cryptographic module evaluation information providing the cryptographic module evaluation information, and outputs the selection result (cryptographic module evaluation information) to the controller 108. In this case, assuming that not only the cryptographic algorithm but also the category ID are designated from the controller 108, the cryptographic module and/or the cryptographic module evaluation description of the particular cryptographic module can be selected also with the category ID as an input.

The key/parameter data base 103 stores the cryptographic key creation condition information providing the condition information (including the cryptographic algorithm ID) used for creation of the cryptographic key and the cryptographic method parameter used in each cryptographic algorithm and the cryptographic key information. In the case under consideration, the key/parameter database 103 stores the cryptographic key information, the cryptographic method parameter information and the cryptographic key creation condition information. Specifically, they are shown as the key parameter data in FIG. 16. The cryptographic method parameter information is defined as a value (the value g,p of y=g^x mod p in terms of the ELGamal cryptosystem) for determining the cryptographic algorithm uniquely.

The key selection management unit 104, upon receipt of the input of the cryptographic process ID (key creation) from the controller 108, outputs the cryptographic key, the cryptographic method parameter information and the cryptographic algorithms ID corresponding to the received cryptographic process ID (key creation) to the controller 108.

The key selection/key management unit 104 has a cryptographic key selection unit 104a which, supplied with the cryptographic process ID (key creation), selects the key, the cryptographic method parameter information and the cryptographic algorithms ID from the key/parameter database and the cryptographic process information database and outputs them to the controller 108.

Figure 16:
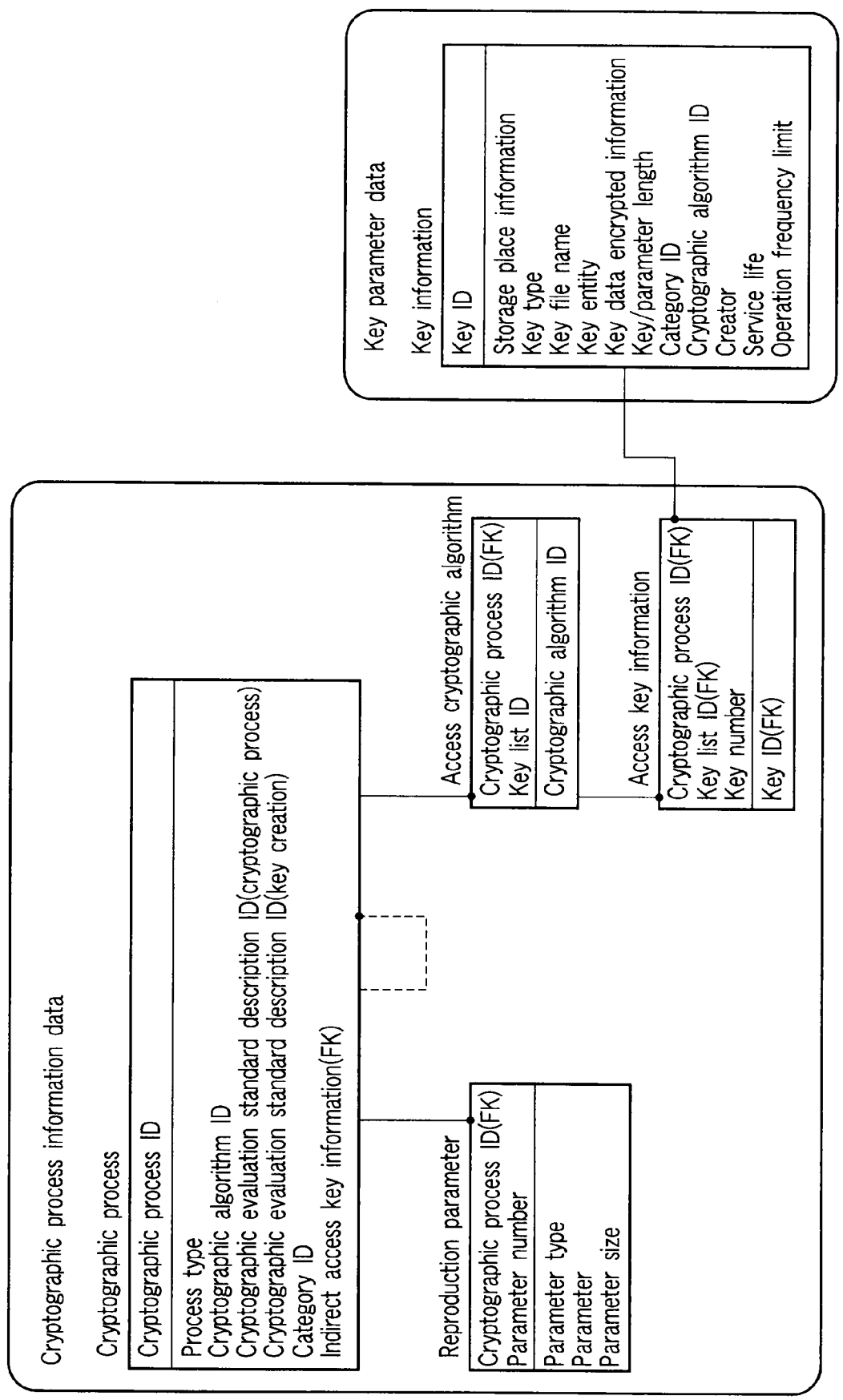
FIG. 16 is a diagram showing an example of the structure of a key parameter database and a cryptographic process information database shared among the third, fourth and fifth embodiments.

The cryptographic key selection unit 104a, upon receipt of the cryptographic process ID (key creation) from the controller 108, searches the cryptographic process information database shown in FIG. 16 for the reference cryptographic algorithm table related to the cryptographic process ID using the received cryptographic process ID (key creation) thereby to acquire the key list ID and the cryptographic algorithm ID. With the key list ID and the cryptographic process ID (key creation) thus acquired, the reference key information table is searched to acquire the key ID (plural key IDs may be acquired). With the key ID(s) thus acquired, the key parameter database is searched thereby to acquire the cryptographic key and the cryptographic method parameter information. The cryptographic algorithms ID, the cryptographic key and the cryptographic method parameter information thus acquired are output to the controller 108.

In the case under consideration, the cryptographic process information database is searched by the cryptographic key selection unit 104a. Nevertheless, the cryptographic process information management unit may be requested to search the cryptographic process information database, so that the cryptographic process information management unit thus requested may acquire the cryptographic algorithm ID, the cryptographic key and the cryptographic method parameter from the cryptographic process information database in the manner described above.

The cryptographic process information database 105 stores the information in response to the instruction from the cryptographic process information management unit 106. The information thus stored includes, in correspondence with each other, the cryptographic process ID (cryptographic process) created by the cryptographic process information management unit 106 on the one hand and the cryptographic process condition information for specifying the conditions used by the cryptographic processing unit 107 for the cryptographic process on the other hand. The cryptographic process ID (cryptographic process) is an identifier of the cryptographic process condition information to execute the cryptographic process on the object information sent from the application.

The cryptographic process information management unit 106 includes a cryptographic process ID creation unit 106a for creating the cryptographic process ID (cryptographic process) to specify the cryptographic process condition information for encryption of the object information by the cryptographic process unit 107. The cryptographic process condition information related to the cryptographic process ID (cryptographic process) thus created is stored in the cryptographic process condition information database. Further, the cryptographic process ID (cryptographic process) for identifying the particular cryptographic process condition information is output to the controller 108.

The cryptographic process unit 107 encrypts the object information input from the application 101 in accordance with the cryptographic key extracted by the key select/key management unit, the cryptographic method parameter information and the cryptographic module corresponding to the cryptographic module evaluation description selected by the cryptographic module selection unit 102 thereby to create the cryptographic process result, which is output to the controller 108.

The controller 108 is connected to the application 101, the cryptographic module selection unit 102, the key selection/key management unit 104, the cryptographic process information management unit 106 and the cryptographic process unit 107.

The controller 108 includes a cryptographic process information input unit 108a for receiving the input of the category information and the object information to be encrypted from the application 101, a cryptographic process instruction unit 108b for causing the cryptographic process unit 107 to create the cryptographic process result subjected to the cryptographic process for the object information input from the cryptographic process information input unit 108a, and an output unit 108c for outputting to the application 101 the cryptographic process ID (cryptographic process) created by the cryptographic process information management unit 106 and the cryptographic process result created by the cryptographic processing unit 107.

Next, the operation of the third embodiment will be explained. In this case, an explanation will be given about the cryptographic process with the user storing the cryptographic process ID (key creation) in a state available for use in a predetermined memory.

First, the user selects the object information to be encrypted for the application 101, and inputs an encryption instruction from the input unit such as a keyboard. The application 101 reads the cryptographic process ID (key creation) stored in a predetermined storage area, while at the same time outputting the category ID and the object information input from the user to the controller 108 (step S1). Incidentally, in the description of FIG. 13 that follows, "step S1" indicates "(1) in FIG. 13", "step S2" "(2) in FIG. 13", and so forth. The controller 108 is supplied from the application 101 with the information including the category ID, the cryptographic process ID (key creation) and the object information to be encrypted, and then outputs the cryptographic process ID (key creation) to the key selection/key management unit 104 (step S2). The key selection/key management unit 104 reads, from the key/parameter database 103 and the cryptographic process information database 105, the key, the cryptographic method parameter information and the cryptographic algorithm ID corresponding to the cryptographic process ID (key creation) output from the controller 108 and outputs them to the controller 108. The cryptographic key, the cryptographic method parameter information and the cryptographic algorithm are extracted in the same manner as described above and may be directly extracted by the key selection/key management unit 104. As an alternative, the key selection/key management unit 104 may request and may extract them through the cryptographic process information management unit 106.

The controller 108 outputs the cryptographic algorithm ID output from the key selection/key management unit 104 to the cryptographic module selection unit 102. The cryptographic module selection unit 102, based on the cryptographic algorithm ID output from the controller 108, evaluates the cryptographic module and outputs the evaluation result as cryptographic module evaluation information to the controller 108 (step S3).

The controller 108 outputs the object information, the cryptographic module evaluation information output from the cryptographic module selection unit 102 and the key and the parameter information output from the key selection/key management unit 104 to the cryptographic process unit 107 (step S4).

After the cryptographic module evaluation information, the cryptographic key, the cryptographic method parameter information and the object information are output from the controller 108, the cryptographic process unit 107 executes the cryptographic module satisfying the cryptographic module evaluation information using the parameter information and the key information, so that the object information is encrypted and the resulting ciphertext is output to the controller 108.

Once the ciphertext is output from the cryptographic processing unit 107, the controller 108 creates the cryptographic process condition information (step S5). The cryptographic process condition information thus created is the information for specifying the information, the key and the processing method used for creating the ciphertext from the cryptographic process unit 107, and for example, includes the cryptographic module evaluation information after encryption, the cryptographic algorithm ID (encryption), the category ID, the parameter information and the cryptographic process ID (key creation) required to specify the key. Then, the controller 108 outputs this cryptographic process condition information to the cryptographic process information management unit 106 (step S6).

Once the cryptographic process condition information is output from the controller 108, the cryptographic process information management unit 106 creates the cryptographic process ID (cryptographic process), so that the cryptographic process ID (cryptographic process) thus created and the cryptographic process condition information output from the controller 108 are stored in the cryptographic process information database 105 in correspondence with each other, while at the same time outputting the cryptographic process ID (cryptographic process) to the controller 108. The controller 108 outputs the cryptographic process ID (cryptographic process) and the ciphertext created by the cryptographic process unit 107 to the application 101 (step S7).

According to the third embodiment described above, the cryptographic process ID for specifying the conditions required for the process to encrypt the object information is created and output together with the encrypted object information (plaintext). Thus, the conditions for decrypting the ciphertext can be easily grasped.

<Fourth Embodiment>

Figure 14:
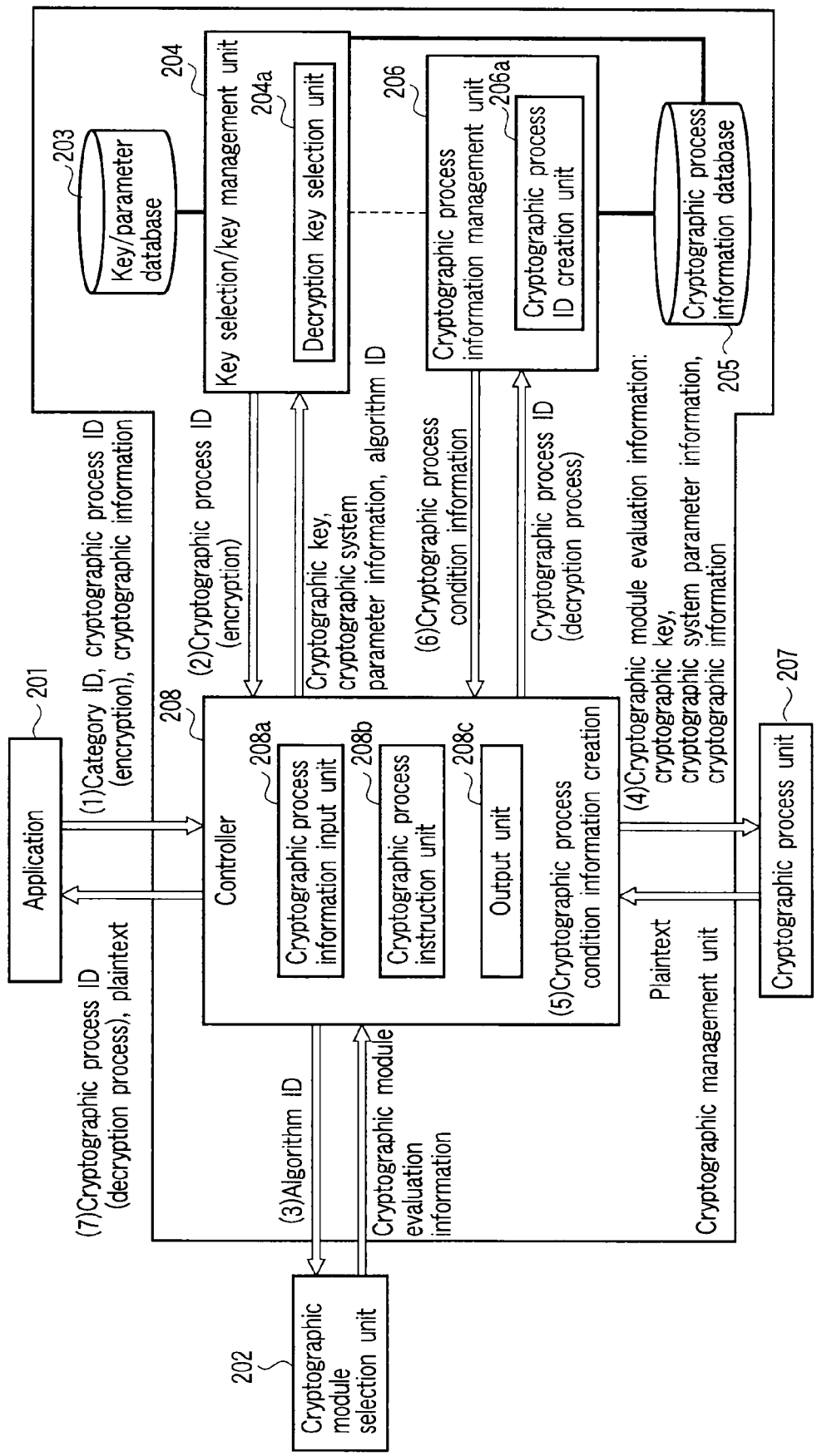
FIG. 14 is a diagram showing the configuration of a cryptographic process system used for a security information communication system according to a fourth embodiment.

Next, a fourth embodiment will be explained. FIG. 14 is a diagram showing the configuration of the cryptographic process system used in the cryptographic module distribution system according to the fourth embodiment.

In FIG. 14, with regard to the basic manner of implementing the cryptographic processing system, FIG. 13 shows a case in which the cryptographic process is executed for the object information and the cryptographic information is output, while FIG. 14 is different in that the decryption process is executed for the cryptographic information and the object information is output. The function and the main points of difference of this embodiment from the functions shown in FIG. 13 will be explained below. Also, the fourth embodiment is based on the third embodiment in that the ciphertext implemented with the predetermined cryptographic process condition information in the third embodiment is decrypted to acquire the object information constituting the original plaintext in accordance with similar conditions in the third embodiment.

The controller 208 is supplied with the ciphertext from the application 201, and upon receipt of a decrypt instruction, activates the various parts of the cryptographic process system, decrypts the ciphertext into the object information and outputs it to the application 201.

The key selection/key management unit 204, like the key selection/key management unit of FIG. 13, has the decryption key selection unit 204a for acquiring the cryptographic key, the cryptographic method parameter information and the cryptographic algorithm ID upon receipt of the cryptographic process ID (encryption) from the controller 208. The cryptographic process ID (encryption) is defined as an identifier for identifying the cryptographic process condition information when the cryptographic process is executed already on the object information.

Once the cryptographic module evaluation information, the cryptographic key, the cryptographic method parameter information and the ciphertext are output from the controller 208, the cryptographic process unit 207 has the function of decrypting the ciphertext by executing the cryptographic module satisfying the cryptographic module evaluation information using the cryptographic key and the cryptographic method parameter information.

Next, the operation of the cryptographic process system according to the fourth embodiment having the configuration described above will be explained.

In this case, the cryptographic process ID (encryption) output from the controller 208 at the time of encrypting the object information is assumed to be read from a predetermined memory by the application 201.

Assume that the user inputs a decryption instruction, an instruction to read the cryptographic process ID and an instruction to select the ciphertext to be decrypted. The application 201 outputs the cryptographic process ID (encryption), the ciphertext and the category ID to the controller 208, while at the same time giving an instruction to execute the decryption process (step S11). Incidentally, in the description of FIG. 14 that follows, "step S11" indicates "(1) of FIG. 14", "step S12" "(2) of FIG. 14", and so forth.

The controller 208 outputs the cryptographic process ID (encryption) to the key selection/key management unit 204 (step S12).

The key selection/key management unit 204, referring to the key/parameter database 203, reads the cryptographic key, the cryptographic method parameter information and the cryptographic algorithm ID required for decryption and corresponding to the cryptographic process ID (encryption) output from the controller 208 and outputs them to the controller 208.

The controller 208 outputs the cryptographic algorithm ID to the cryptographic module selection unit 202 (step S13).

The cryptographic module selection unit 202 extracts the cryptographic module evaluation information from the cryptographic algorithm ID output from the controller 208, and outputs it to the controller 208.

The cryptographic process instruction unit 208b of the controller 208, upon receipt of the cryptographic module evaluation information output from the cryptographic module selection unit 202, outputs the particular cryptographic module evaluation information, the cryptographic key, the cryptographic method parameter information and the ciphertext to the cryptographic process unit 207 (step S14).

Once the cryptographic module evaluation information, the cryptographic key, the parameter information and the ciphertext are output from the controller 208, the cryptographic process unit 207 executes the cryptographic module satisfying the cryptographic module evaluation information using the cryptographic method parameter information and the cryptographic key information, so that the ciphertext is decrypted and output as the object information to the controller 208.

When the object information is output from the cryptographic process unit 207, the controller 208 creates the cryptographic process condition information (step S15) and outputs it to the cryptographic process information management unit 206 (step S16). This cryptographic process condition information includes the cryptographic module evaluation information (decryption) for decryption, the process type, the cryptographic algorithm ID for decryption, the category ID, the decryption system parameter information for decryption and the cryptographic process ID (for encryption) for encrypting the ciphertext to be decrypted.

When the cryptographic process condition information is output from the controller 208, the cryptographic process information management unit 206 creates the cryptographic process ID for decryption, so that the cryptographic process ID thus created and the cryptographic process condition information output from the controller 208 are stored in correspondence with each other in the cryptographic process information database 205, while at the same time outputting the cryptographic process ID (decryption) to the controller 208. The controller 208 outputs, through the output unit 208c, the cryptographic process ID and the object information created by the cryptographic process unit 207, to the application 201 through the output unit 208c (step S17).

According to the fourth embodiment described above, the ciphertext decrypted by creating the cryptographic process ID for specifying the conditions required for the process of converting the ciphertext to the object information is output together with the object information (plaintext), and therefore, the conditions for the decryption process executed on the object information can be grasped easily.

<Fifth Embodiment>

Next, the fifth embodiment will be explained. According to the fifth embodiment described below, even in the case where the user has no cryptographic process ID (key creation) in the third embodiment, the cryptographic key is created in the cryptographic process system and used for encryption and decryption. Although the description that follows deals with the cryptographic process, the decryption can also be handled in similar fashion as an application of the fourth embodiment.

Figure 15:
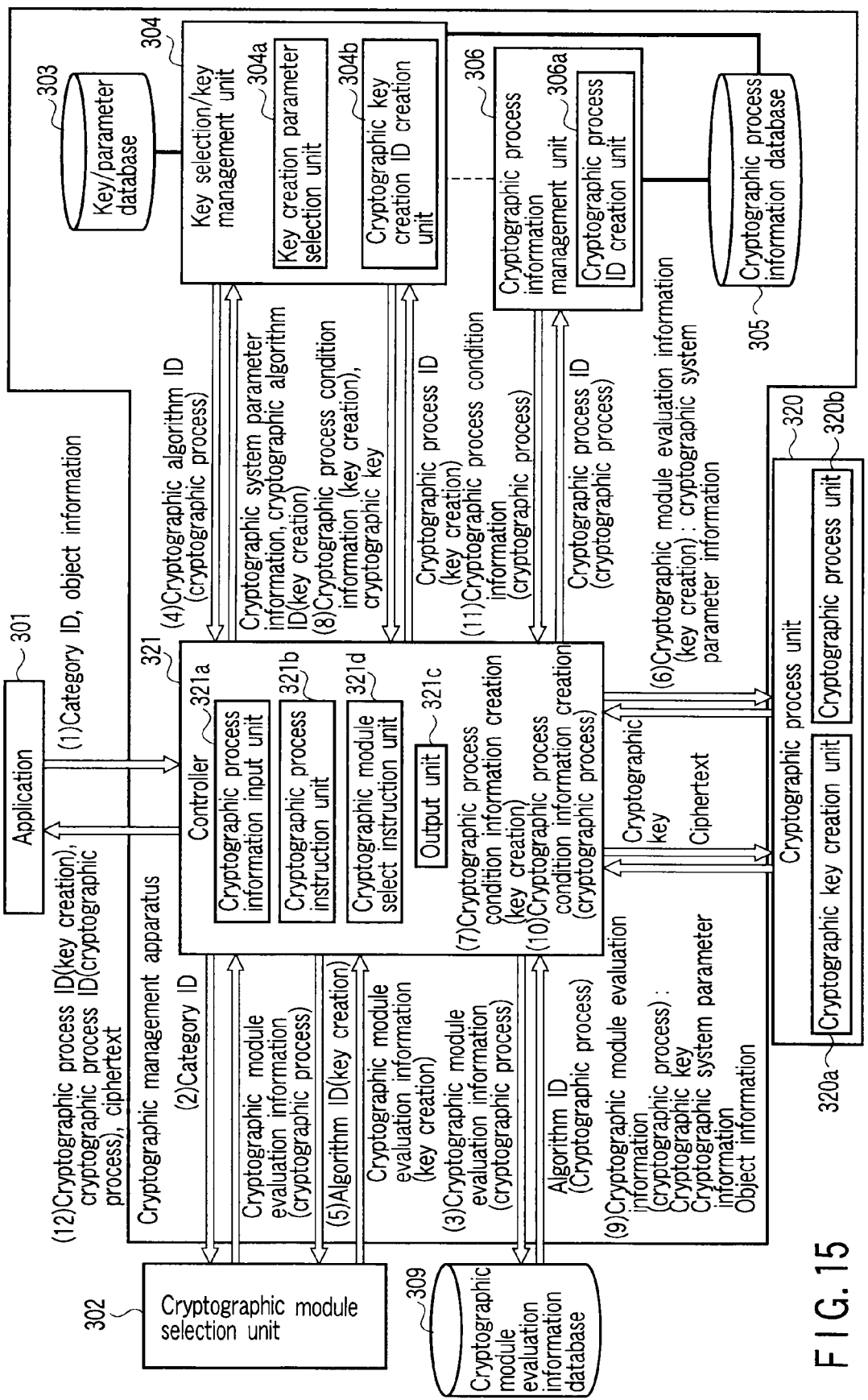
FIG. 15 is a diagram showing the configuration of a cryptographic process system used for a security information communication system according to a fifth embodiment.

FIG. 15 is a diagram showing the configuration of the cryptographic process system used in the cryptographic module distribution system according to the fifth embodiment.

In FIG. 15, the application 301 outputs the object information to be encrypted to the controller 321 together with the category ID, and the information after the cryptographic process (ciphertext, cryptographic process ID (key creation), cryptographic process ID (cryptographic process)) are obtained from the controller 321.

Once the category ID is output from the controller 321, the cryptographic module selection unit 302 outputs the cryptographic module evaluation information (cryptographic process) corresponding to the particular category ID to the controller 321. This cryptographic module evaluation information (cryptographic process) is an identifier of the evaluation information for the cryptographic module to execute the cryptographic process.

The key/parameter database 303 stores the cryptographic method parameter used for each cryptographic algorithm and the cryptographic key information.

The key selection/key management unit 304 includes a key creation parameter selection unit 304a supplied with the selection result of the cryptographic module selection unit 202 to select and output the cryptographic method parameter and a cryptographic key creation ID creation unit 304b for creating the cryptographic process ID (key creation) to specify the cryptographic key and the cryptographic key creation condition information by recording, in the key/parameter database 303 and the cryptographic process information database 305, the cryptographic key created in the cryptographic process unit described later and the cryptographic process condition information (key creation) providing the conditions for creating the cryptographic key.

The key creation parameter selection unit 304a receives the cryptographic algorithm ID (cryptographic process) from the controller 321, creates the cryptographic algorithm ID (key creation) and the cryptographic method parameter information from the cryptographic algorithm ID (cryptographic process) thus received, and outputs the created algorithm ID (key creation) and the cryptographic method parameter to the controller 321.

The cryptographic key creation ID creation unit 304b receives the cryptographic process condition information (key creation) and the cryptographic key from the controller 321, creates the cryptographic process ID (key creation) and stores the created cryptographic process ID (key creation), the received cryptographic process condition information (key creation) and the key in the key/parameter database 303 and the cryptographic process information database 305 by relating them to each other.

In this case, the cryptographic key creation ID creation unit 304b stores the data in the cryptographic process information database 305. Nevertheless, the cryptographic process information management unit 306 may be requested to store the data in the cryptographic process information database 305.

The cryptographic process information database 305 stores the information in compliance with the instruction from the cryptographic process information management unit 306. The information thus stored include, arranged in correspondence with each other, the cryptographic process ID (key creation) or the cryptographic process ID (cryptographic process) created by the cryptographic process information management unit 306 and the cryptographic process condition information (key creation) or the cryptographic process condition information (cryptographic process) for specifying the conditions used when the cryptographic process unit encrypts the object information.

The cryptographic process information management unit 306 includes a cryptographic process ID creation unit 306a for creating the cryptographic process ID (cryptographic process) to specify the cryptographic process condition information for specifying the conditions used by the cryptographic process unit 320 to encrypt the object information.

The cryptographic processing unit 320 includes a cryptographic key creation unit 320a supplied with the cryptographic method parameter for creating the key in accordance with the key creation module corresponding to the cryptographic module evaluation information (key creation) selected by the cryptographic module selection unit 302 thereby to output the created cryptographic key, and a cryptographic process unit 320b in which the object information output from the application 301 to the controller 301 to the controller 321 is encrypted in accordance with the cryptographic module corresponding to the cryptographic module evaluation information (cryptographic process) selected by the cryptographic module selection unit 302 thereby to create and output the cryptographic process result to the controller 321.

The controller 321 includes a cryptographic module select instruction unit 321d, a cryptographic process information input unit 321a, an output unit 321c and a cryptographic process instruction unit 321b. In the cryptographic module select instruction unit 321d, the cryptographic module selection unit 302 is caused to select the key creation module for creating the cryptographic key and the cryptographic process module for encrypting the object information, in accordance with the selection result input based on the category ID and the algorithm ID thereby to obtain the particular selection result. The cryptographic process information input unit 321a receives the object information to be encrypted and the category ID. The output unit 321c outputs the ciphertext as the result of encrypting the object information, the cryptographic process ID (key creation) created at the time of key creation and the cryptographic process ID (cryptographic process) created at the time of executing the cryptographic process. The cryptographic process instruction unit 321b causes the cryptographic process unit to execute the cryptographic process or create the key.

Figure 17:
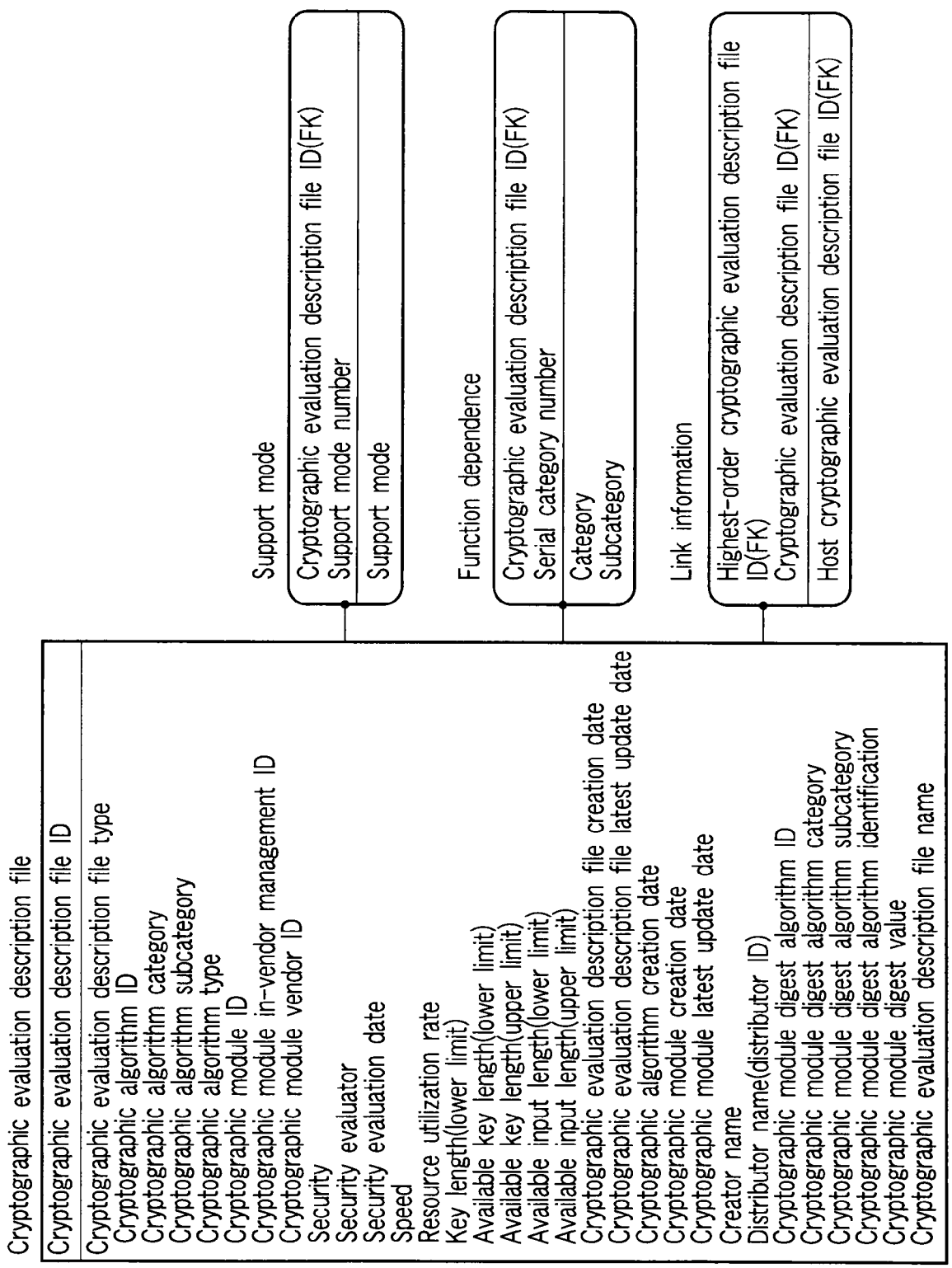
FIG. 17 is a diagram showing an example of the structure of a cryptographic module evaluation database shared among the third, fourth and fifth embodiments.

The cryptographic module evaluation information database 309 stores the cryptographic module evaluation information as shown in FIG. 17. The cryptographic module evaluation information contains the cryptographic algorithm ID.

Next, the operation of the cryptographic process system according to the fifth embodiment will be explained.

When the category ID and the object information are input from the user through the input unit, the application 301 outputs the category ID and the object information to the controller 321 (step S21). Incidentally, in the description of FIG. 15 that follows, "step S21" indicates "(1) of FIG. 15", "step S22" "(2) of FIG. 15", and so forth.

The controller 321 outputs the category ID to the cryptographic module selection unit 302 (step S22). The cryptographic module selection unit 302 creates or acquires the cryptographic module evaluation information (cryptographic process) corresponding to the category ID output from the controller 321 and outputs it to the controller 321. The controller 321, based on the cryptographic module evaluation information (cryptographic process) output from the cryptographic module selection unit 302, accesses the cryptographic module evaluation information data base 309 and acquires the cryptographic algorithm ID (cryptographic process) for specifying the algorithm satisfying the cryptographic module evaluation information (step S23). The cryptographic algorithm ID thus acquired is output to the key selection/key management unit 304 (step S24).

In the key selection/key management unit 304, the cryptographic method parameter information and the cryptographic algorithm ID (key creation) indicating the cryptographic algorithm for cryptographic key creation are created from the algorithm ID (cryptographic process) output from the controller 321, and output to the controller 321.

Once the cryptographic algorithm ID (key creation) is output, the controller 321 outputs the algorithm ID (key creation) to the cryptographic module selection unit 302 (step S25).

The cryptographic module selection unit 302 creates the cryptographic module evaluation information (key creation) from the cryptographic algorithm ID (key creation) output from the controller 321, and outputs it to the controller 321. The controller 321, upon receipt of the cryptographic module evaluation condition information (key creation), outputs the particular cryptographic process condition information (key creation) and the cryptographic method parameter information to the cryptographic process unit 320 (step S26), while at the same time receiving the cryptographic key information created by the cryptographic process unit 320.

Upon receipt of the cryptographic key information, the controller 321 creates the cryptographic process condition information (key creation) (step S27). The cryptographic process condition information (key creation) thus created includes the cryptographic module evaluation information (cryptographic process) for the cryptographic process, the cryptographic module evaluation information (key creation) for key creation, the process type, the cryptographic algorithm ID (cryptographic process) for the cryptographic process, the category ID (cryptographic process) for the cryptographic process, the cryptographic method parameter information, the cryptographic key and the cryptographic process condition information (key creation). This cryptographic process condition information (key creation) is output to the key selection/key management unit 304 (step S28).

The key selection/key management unit 304 creates the cryptographic process ID (key creation) corresponding to the cryptographic process condition information (key creation) and outputs the cryptographic process ID (key creation) thus created to the controller 321.

When the cryptographic process ID (key creation) is output from the key selection/key management unit 304, the controller 321 outputs the cryptographic module evaluation information (cryptographic process), the cryptographic key, the cryptographic method parameter information and the object information to the cryptographic process unit 320 (step S29). The cryptographic process unit 320, using the cryptographic key and the cryptographic method parameter information output from the controller 321, selects the cryptographic module satisfying the cryptographic module evaluation information (cryptographic process) and by encrypting the object information, outputs the object information to the controller 321.

The controller 321, upon receipt of the ciphertext from the cryptographic process unit 320, creates the cryptographic process condition information (cryptographic process) (step S30). The cryptographic process condition information (cryptographic process) thus created include the cryptographic module evaluation information (cryptographic process) for the cryptographic process, the process type, the cryptographic algorithm ID (cryptographic process), the category ID (cryptographic process), the cryptographic method parameter information and the cryptographic process ID (key creation) for cryptographic key creation. The controller 208 outputs this cryptographic process condition information (cryptographic process) to the cryptographic process information management unit 306 (step S31).

The cryptographic process information management unit 306, upon receipt of the cryptographic process condition information (cryptographic process), creates the cryptographic process ID (cryptographic process) as an identifier of the particular cryptographic process condition information, so that the cryptographic process ID (cryptographic process) thus created and the cryptographic process condition information (cryptographic process) are stored in correspondence with each other in the cryptographic process information database 305, and the cryptographic process ID (cryptographic process) is output to the controller 321. When the cryptographic process ID (cryptographic process) is output from the cryptographic process information management unit 306, the controller 321 outputs the particular cryptographic process ID (cryptographic process), the cryptographic process ID (key creation) and the ciphertext to the application 301 (step S32).

According to the fifth embodiment, the user can encrypt the object information without holding the cryptographic process ID. Also, the object information (plaintext) encrypted can be decrypted by designating the cryptographic process ID (cryptographic process) and outputting the ciphertext to the controller 321.

<Sixth Embodiment>

Next, the sixth embodiment will be explained. FIG. 18 is a diagram showing the configuration of the cryptographic process system used in the cryptographic module distribution system according to the sixth embodiment. Unlike FIG. 13 showing a case in which the object information is encrypted anew to output the cryptographic process information, FIG. 18 shows a case in which the cryptographic process is executed again under the same conditions as the previously executed cryptographic process thereby to output the cryptographic process information. In the sixth embodiment, therefore, the cryptographic module selection unit 102 described above is omitted while a cryptographic process condition information acquisition unit 106*b* is added. Also, the application 101 and the cryptographic process information input unit 108*a* can perform the operation corresponding to the repetitive cryptographic process.

In FIG. 18, the application 101 outputs the object information to be encrypted, together with the cryptographic process ID (encryption), to the controller 108 and acquires the information subjected to the cryptographic process (ciphertext, cryptographic process ID (encryption/reproduction)) from the controller 108.

The key/parameter database 103 stores the cryptographic key information and the cryptographic method parameter used with each cryptographic algorithms.

The key selection/key management unit 104 includes a cryptographic key selection unit 104*a* which, upon receipt of the cryptographic process ID (encryption) from the controller 108, acquires the cryptographic key, the cryptographic method parameter information and the cryptographic algorithms ID.

The cryptographic process ID (encryption) is defined as an identifier of the cryptographic process condition information after encryption of the object information.

The cryptographic process information database 105, in response to the instruction from the cryptographic process information management unit 106, stores the cryptographic process ID (encryption/reproduction) and the cryptographic process information in correspondence with each other. The cryptographic process ID (encryption/reproduction) is an identifier of the cryptographic process condition information of the cryptographic process in the case where the cryptographic process is executed again under the same conditions as in the previously executed cryptographic process. The cryptographic process condition information is the information for specifying the information, the key and the processing method used to create the ciphertext from the cryptographic process unit 107, such as the cryptographic module evaluation information used for encryption, the cryptographic algorithm ID (encryption), the parameter information or the cryptographic process ID (key creation) required to specify the key. The cryptographic module evaluation information, as shown in FIG. 17, includes the cryptographic algorithms ID, the cryptographic module ID and the security evaluation result.

The cryptographic process information management unit 106 includes a cryptographic process ID creation unit 106*a* for creating the ID (encryption/reproduction) to specify the cryptographic process condition information for specifying the conditions used by the cryptographic process unit 107 for encrypting the object information, and a cryptographic process condition information acquisition unit 106*b* for searching the cryptographic process information database 105 with the cryptographic process ID (encryption) previously used for the cryptographic process and retrieving the related cryptographic process condition information.

In the cryptographic process unit 107, the object information output from the application 101 to the controller 108 is encrypted in accordance with the cryptographic module corresponding to the cryptographic module evaluation information contained in the cryptographic process condition information obtained from the cryptographic process information management unit 106, so that the cryptographic process result is created and output to the controller 108.

The controller 108 is connected to the application 101, the key selection/key management unit 104 and the cryptographic process information management unit 106.

The controller 108 includes a cryptographic process information input unit 108*a* for receiving, from the application 101, the object information to be encrypted and the cryptographic process ID (encryption) created previously for the cryptographic process, a cryptographic process instruction unit 108*b* in which the result of encrypting the object information input from the cryptographic process information input unit 108*a* is created by the cryptographic process unit 107, and an output unit 108*c* for outputting to the application 101 the cryptographic process ID (encryption/reproduction) created by the cryptographic process information management unit 106 and the cryptographic process result created by the cryptographic process unit 107.

Next, the operation of the sixth embodiment will be explained. An explanation will be given about the cryptographic process executed again in the case where the user stores the cryptographic process ID (encryption) in the form available for use in a predetermined memory.

First, assume that the user selects the object information to be encrypted for the application 101 and the encryption/reproduction instruction is input from the input unit such as a keyboard. In the process, the application 101 reads the cryptographic process ID (encryption) stored in a predetermined memory area while at the same time outputting the input object information to the controller 108 (step S1). In the description that follows, "step S41" should be interpreted to read "(1) of FIG. 18", "step S42" to read "(2) of FIG. 18", and so forth.

In the controller 108, assume that the cryptographic process ID (encryption) and the object information are input from the application 101 (step S41). The cryptographic process information input unit 108*a* outputs the cryptographic process ID (encryption) to the cryptographic process information management unit 106 (step S42).

In the cryptographic process information management unit 106, the cryptographic process condition information acquisition unit 106*b* reads the cryptographic process condition information corresponding to this cryptographic process ID (encryption) from the cryptographic process information database 105 and outputs it to the controller 108.

In the controller 108, the cryptographic process information input unit 108*a* outputs the cryptographic process ID (encryption) output from the application 101 to the key selection/key management unit 104 (step S43).

In the key selection/key management unit 104, the cryptographic key selection unit 104*a* reads the key, the cryptographic method parameter information and the cryptographic algorithm ID corresponding to the cryptographic process ID (encryption) from the key/parameter database 103 and the cryptographic process information database 105 and outputs them to the controller 108. The cryptographic key, the cryptographic method parameter information and the cryptographic algorithm ID referred to herein are extracted in the same manner as described above, and may alternatively be extracted directly by the key selection/key management unit 104 or through the cryptographic process information management unit 106 at the request of the key selection/key management unit 104.

In the controller 108, the cryptographic process instruction unit 108*b* acquires the cryptographic module evaluation information from the cryptographic process condition information output from the cryptographic process information management unit 106 (step S44).

In the controller 108, the cryptographic process instruction unit 108*b* outputs to the cryptographic process unit 107 the object information, the cryptographic module evaluation information and the key and the cryptographic method parameter information output from the key selection/key management unit 104 (step S45).

The cryptographic processing unit 107, upon receipt of the object information, the cryptographic module evaluation information, the key and the cryptographic method parameter information, executes the cryptographic module to satisfy the cryptographic module evaluation information based on the cryptographic method parameter information and the key. As a result, the ciphertext obtained by encrypting the object information is output to the controller 108.

When the ciphertext is output from the cryptographic process unit 107, the cryptographic process instruction unit 108*b* of the controller 108 creates the cryptographic process condition information (step S46). The cryptographic process condition information thus created is the information used for specifying the information, the key and the processing method used to create the ciphertext from the cryptographic processing unit 107, and include the cryptographic module evaluation information for encryption, the cryptographic algorithm ID (encryption), the parameter information and the cryptographic process ID (key creation) required for specifying the key. In the controller 108, the cryptographic process instruction unit 108*b* outputs this cryptographic process condition information to the cryptographic process information management unit 106 (step S47).

In the cryptographic process information management unit 106, the cryptographic process ID creation unit 106*a*, upon receipt of the cryptographic process condition information, creates the cryptographic process ID (encryption/reproduction), so that the cryptographic process ID (encryption/reproduction) thus created and the cryptographic process condition information received from the controller 108 are stored in correspondence with each other in the cryptographic process information database 105, while at the same time outputting the cryptographic process ID (encryption/reproduction) to the controller 108. In the controller 108, the output unit 108*c* outputs the cryptographic process ID (encryption/reproduction) and the ciphertext created by the cryptographic process unit 107 to the application 101 (step S48).

According to the sixth embodiment described above, the conditions required for encrypting the object information are acquired from the cryptographic process ID output in previous sessions. In the case where the cryptographic process is desired under the same conditions (the same key, the same cryptographic parameter) as in the previous sessions, therefore, what is required in the application 101 is only to input the cryptographic process ID.

According to the third to sixth embodiments described above, the cryptographic key and the cryptographic method parameter information required for the cryptographic process are centrally managed. Therefore, by showing not the entity of the key or the parameter information but only the ID that can specify them to the user, the information to be managed on the part of the user can be reduced and the cryptographic process can be easily executed.

Also, the information for executing the cryptographic process is managed and the ID for accessing the particular information is supplied to the user. Thus, in the subsequent processes (decryption process, reproduction process), the cryptographic process can be executed simply by designating the particular ID without inputting the information for the cryptographic process such as the key, the parameter information or the algorithm.

In other words, the information such as the key and the parameter required for the cryptographic process are managed by attaching the cryptographic process ID thereto in accordance with the combination of the information. Therefore, the user, informed of only the cryptographic process ID, is not required to grasp all the information, and even the user having no knowledge of the encryption or decryption can easily execute the cryptographic process or decryption process. Also, by managing the cryptographic process ID, the management burden can be reduced.

Also, the cryptographic process is classified into plural (11 types, for example) categories. The required key information is automatically created within the cryptographic process system by designating the category, and the cryptographic process is executed using the key. As a result, the user is required only to designate the category ID at the time of executing the cryptographic process.

Incidentally, as an alternative, the cryptographic process may be managed in such a manner that the program for realizing the functions of the processing unit according to the invention is recorded in a computer readable recording medium and read and executed by the computer system. Incidentally, the "computer system" includes the OS and the hardware such as the peripheral devices. Also the "computer system" is assumed to include the WWW system having the environment to provide the home page (or the display environment). Also, the "computer readable recording medium" is assumed to be the storage device including the portable medium such as the flexible disk, magnetooptic disk, ROM or CD-ROM and the hard disk built in the computer system. Further, in the case where the program is transmitted through the network such as the internet or the communication line such as telephone, the "computer readable recording medium" includes the volatile memory (RAM) or the like which holds a program for a predetermined length of time in the computer system constituting the server or the client.

Also, the program may be transmitted from the computer system with the program stored in a storage unit or the like, to another computer system through a transmission medium or the transmission wave in the transmission medium. The "transmission medium" for transmitting the program is defined as a medium having the function of transmitting the information such as the internet or the like network (communication network) or the communication channel (communication line) such as the telephone line. Further, the program may be such as to realize a part of the functions described above. Furthermore, what is called the differential filter (differential program) may be used which can be realized by combining the aforementioned functions with the program recorded in the computer system.

And, the present invention can be used in signature generation in addition to encryption because each cryptographic module selection unit 102, 159, 202 and 302 recognize a cryptographic method category such as encryption or signature generation. "The cryptographic process on the object information" means that encryption and signature generation are included comprehensively.

The embodiments of the invention have been explained in detail above with reference to the drawings, and the specific configuration thereof is not limited to these embodiments, but include any other design without departing from the spirit of the invention.

What is claimed is:

1. A cryptographic management apparatus, comprising:
a storage device which stores cryptographic key information including a cryptographic key to encrypt object information and cryptographic process condition information including the cryptographic key information as the encryption condition for encrypting the object information, the cryptographic process condition information being provided to specify information, the cryptographic key, and a processing method used for creating a result of execution of the cryptographic process on the object information, the cryptographic process condition information further including a cryptographic process ID, which is an identifier of the cryptographic process condition information, cryptographic method parameter information used in each cryptographic algorithm, a category ID indicating a category of the cryptographic algorithm, a cryptographic algorithm ID indicating the cryptographic algorithm used for the processing method, and a key creation process ID being an identifier of cryptographic key creation condition information, the cryptographic key creation condition information including the cryptographic key and the cryptographic method parameter information;
a cryptographic process information input device configured to receive an input of the object information and cryptographic key creation request information, the cryptographic key creation request information also including the category ID;
a cryptographic parameter information acquisition device configured to acquire cryptographic method parameter information to create the cryptographic key corresponding to the creation request information from the storage device based on the category ID in the cryptographic key creation request information input, the cryptographic method parameter information being a value, used in a mathematical formula in a cryptographic algorithm, to determine the cryptographic algorithm uniquely;
a cryptographic key creation ID creation device configured to create cryptographic key creation condition information by relating the cryptographic method parameter information and the cryptographic key created based on the acquired cryptographic method parameter information to each other and attach an identifier of the created cryptographic key creation condition information;
a first cryptographic module evaluation description information acquisition device configured to acquire evaluation description information for the cryptographic module optimally adapted to the cryptographic process corresponding to the created cryptographic key creation condition information, the evaluation description information being digitized information for indicating a security of a cryptographic method, a cryptographic processing speed, and a key length required for the cryptographic module;

a cryptographic process ID creation device configured to attach, to the object information, an identifier of the cryptographic process condition information at the time of encrypting the object information with the cryptographic key information and the cryptographic module corresponding to the acquired evaluation description information; and an output device configured to output the attached identifier of the cryptographic process condition information, the attached identifier of the created cryptographic key creation condition information, and the result of the cryptographic process executed on the object information.

2. The cryptographic management apparatus according to claim 1, wherein the first cryptographic module evaluation description information acquisition device, with regard to a cryptographic module selection unit connected to the cryptographic management apparatus, acquires the evaluation description information for the cryptographic module adapted to the cryptographic process corresponding to the created cryptographic key creation condition information.

3. The cryptographic management apparatus according to claim 2, further comprising:

a second cryptographic module evaluation description information acquisition device configured to acquire the evaluation description information of the cryptographic key creation module for creating the cryptographic key from the cryptographic method parameter information; and a cryptographic key creation device configured to create the cryptographic key based on the evaluation description information of the cryptographic key creation module acquired from the second cryptographic module evaluation description information acquisition device and the cryptographic method parameter information acquired from the cryptographic parameter information acquisition device.

4. The cryptographic management apparatus according to claim 3, further comprising:

a cryptographic process device configured to execute the cryptographic process for the object information based on the cryptographic module evaluation description information acquired by the first cryptographic module evaluation description acquisition device and the cryptographic key information.

5. The cryptographic management apparatus according to claim 1, further comprising:

a second cryptographic module evaluation description information acquisition device configured to acquire the evaluation description information of the cryptographic key creation module for creating the cryptographic key from the cryptographic method parameter information; and a cryptographic key creation device configured to create the cryptographic key based on the evaluation description information of the cryptographic key creation module acquired from the second cryptographic module evaluation description information acquisition device and the cryptographic method parameter information acquired from the cryptographic parameter information acquisition device.

6. The cryptographic management apparatus according to claim 5, further comprising:

a cryptographic process device configured to execute the cryptographic process for the object information based on the cryptographic module evaluation description information acquired by the first cryptographic module evaluation description acquisition device and the cryptographic key information.

7. A decryption management apparatus, comprising:

a storage device which stores decryption key information including a decryption key for executing a decryption process on encrypted information and decryption process condition information as the decryption condition including the decryption key information for execution of the decryption process, the decryption process condition information being provided to specify information, the decryption key, and a processing method used for creating a result of execution of the decryption process on the encrypted information, the decryption process condition information further including a cryptographic process ID, which is an identifier of the decryption process condition information, decryption system parameter information used in each cryptographic algorithm, a category ID indicating a category of the cryptographic algorithm, a cryptographic algorithm ID indicating the cryptographic algorithm used for the decryption process, and a key creation process ID being an identifier of decryption key creation condition information, the decryption key creation condition information including the decryption key and the decryption system parameter information;

a decryption process information input device configured to receive an input of the encrypted information and decryption key creation request information, the decryption key creation request information including the category ID;

a decryption parameter information acquisition device configured to acquire decryption system parameter information for creating the decryption key corresponding to the creation request information from the storage device based on the category ID in the decryption key creation request information input, the decryption system parameter information being a value, used in a mathematical formula in a cryptographic algorithm, to determine the cryptographic algorithm uniquely;

a decryption key creation ID creation device configured to create decryption key creation condition information by relating the decryption key created based on the acquired decryption system parameter information and the decryption system parameter information to each other and attach an identifier of the created decryption key creation condition information;

a first decryption evaluation description information acquisition device configured to acquire evaluation description information of a decryption module optimally adapted to the decryption process corresponding to the created decryption key creation condition information, the evaluation description information being digitized information for indicating a security of a decryption method, a decryption processing speed, and a key length required for the decryption module;

a decryption process ID creation device configured to attach an identifier of the decryption process condition information for execution of the decryption process on the encrypted information based on the decryption key information and the decryption module corresponding to the acquired evaluation description information; and an output device configured to output the attached identifier of the decryption process condition information, the attached identifier of the created decryption key creation condition information, and the result of the decryption process executed on the encrypted information.

8. The decryption management apparatus according to claim 7, wherein the first decryption evaluation description information acquisition device, with regard to a decryption module selection unit connected to the decryption management apparatus, acquires the evaluation description information of the decryption module adapted to the decryption process corresponding to the created decryption key creation condition information.

9. The decryption management apparatus according to claim 8, further comprising:

a second decryption evaluation description information acquisition device configured to acquire the evaluation description information of a decryption key creation module for creating the decryption key from the decryption system parameter information; and a decryption key creation device configured to create the decryption key based on the evaluation description information of the decryption key creation module acquired from the second decryption evaluation description information acquisition device and the decryption system parameter information acquired from the decryption parameter information acquisition device.

10. The decryption management apparatus according to claim 9, further comprising:

a decryption process device configured to execute the decryption process on the encrypted information based on the decryption evaluation description information acquired by the first decryption evaluation description acquisition device and the decryption key information.

11. The decryption management apparatus according to claim 7, further comprising:

a second decryption evaluation description information acquisition device configured to acquire the evaluation description information of a decryption key creation module for creating the decryption key from the decryption system parameter information; and a decryption key creation device configured to create the decryption key based on the evaluation description information of the decryption key creation module acquired from the second decryption evaluation description information acquisition device and the decryption system parameter information acquired from the decryption parameter information acquisition device.

12. The decryption management apparatus according to claim 11, further comprising:

a decryption process device configured to execute the decryption process on the encrypted information based on the decryption evaluation description information acquired by the first decryption evaluation description acquisition device and the decryption key information.

13. A non-transitory computer-readable storage medium storing a program that, when executed, causes a cryptographic management apparatus to perform cryptographic management, the program comprising:

a program code for causing the cryptographic management apparatus to execute the process of storing, sequentially in a storage device, cryptographic key information including a cryptographic key for executing a cryptographic process on object information and cryptographic process condition information including the cryptographic key information as the cryptographic conditions for execution of the cryptographic process, the cryptographic process condition information being provided to specify information, the cryptographic key, and a processing method used for creating a result of execution of the cryptographic process on the object information, the cryptographic process condition information further including a cryptographic process ID, which is an identifier of the cryptographic process condition information, cryptographic method parameter information used in each cryptographic algorithm, a category ID indicating a category of the cryptographic algorithm, a cryptographic algorithm ID indicating the cryptographic algorithm used for the processing method, and a key creation process ID being an identifier of cryptographic key creation condition information, the cryptographic key creation condition information including the cryptographic key and the cryptographic method parameter information;

a program code for causing the cryptographic management apparatus to sequentially execute the process of receiving an input of the object information and cryptographic key creation request information, the cryptographic key creation request information including the category ID;

a program code for causing the cryptographic management apparatus to sequentially execute the process of acquiring cryptographic method parameter information for creating the cryptographic key corresponding to the creation request information from the storage device based on the category ID in the cryptographic key creation request information input, the cryptographic method parameter information being a value, used in a mathematical formula in a cryptographic algorithm, to determine the cryptographic algorithm uniquely;

a program code for causing the cryptographic management apparatus to sequentially execute the process of creating cryptographic key creation condition information by relating the cryptographic key created based on the acquired cryptographic method parameter information and the cryptographic method parameter information to each other and attaching an identifier of the created cryptographic key creation condition information;

a program code for causing the cryptographic management apparatus to sequentially execute the process of acquiring evaluation description information of a cryptographic module optimally adapted to the cryptographic process corresponding to the cryptographic key creation condition information created, the evaluation description information being digitized information for indicating a security of a cryptographic method, a cryptographic processing speed, and a key length required for the cryptographic module;

a program code for causing the cryptographic management apparatus to sequentially execute the process of attaching an identifier of the cryptographic process condition information at the time of execution of the cryptographic process on the object information with the cryptographic key information and the cryptographic module corresponding to the acquired evaluation description information; and a program code for causing the cryptographic management apparatus to sequentially execute the process of outputting the attached identifier of the cryptographic process condition information, the attached identifier of the created cryptographic key creation condition information, and the result of the cryptographic process executed on the object information.

14. A non-transitory computer-readable storage medium storing a program that, when executed, causes a decryption management apparatus to perform decryption management, the program comprising:

a program code for causing the decryption management apparatus to sequentially execute the process of storing, in a storage device, decryption key information including a decryption key for executing a decryption process on encrypted information and decryption process condition information including the decryption key information as the decryption condition at the time of executing the decryption process, the decryption process condition information being provided to specify information, the decryption key, and a processing method used for creating a result of execution of the decryption process on the encrypted information, the decryption process condition information further including a cryptographic process ID, which is an identifier of the decryption process condition information, decryption system parameter information used in each cryptographic algorithm, a category ID indicating a category of the cryptographic algorithm, a cryptographic algorithm ID indicating the cryptographic algorithm used for the decryption process, and a key creation process ID being an identifier of decryption key creation condition information, the decryption key creation condition information including the decryption key and the decryption system parameter information;

a program code for causing the decryption management apparatus to sequentially execute the process of receiving an input of the encrypted information and decryption key creation request information, the decryption key creation request information including the category ID;

a program code for causing the decryption management apparatus to sequentially execute the process of acquiring decryption system parameter information for creating the decryption key corresponding to the creation request information from the storage device based on the category ID in the decryption key creation request information input, the decryption system parameter information being a value, used in a mathematical formula in a cryptographic algorithm, to determine the cryptographic algorithm uniquely;

a program code for causing the decryption management apparatus to sequentially execute the process of creating decryption key creation condition information by relating the decryption key created based on the acquired decryption system parameter information and the decryption system parameter information to each other and attaching an identifier of the created decryption key creation condition information;

a program code for causing the decryption management apparatus to sequentially execute the process of acquiring evaluation description information for a decryption module optimally adapted to the decryption process corresponding to the created decryption key creation condition information, the evaluation description information being digitized information for a security of a decryption method, a decryption processing speed, and a key length required for the cryptographic module;

a program code for causing the decryption management apparatus to sequentially execute the process of attaching an identifier of the decryption process condition information at the time of executing the decryption process on the encrypted information based on the decryption key information and the decryption module corresponding to the acquired evaluation description information; and a program code for causing the decryption management apparatus to sequentially execute the process of outputting the attached identifier of the decryption process condition information, the attached identifier of the created decryption key creation condition information, and the result of the decryption process executed on the encrypted information.

* * * * *